United States Patent
Jain et al.

(10) Patent No.: US 12,219,009 B2
(45) Date of Patent: Feb. 4, 2025

(54) VIRTUAL DEVICE PORTABILITY

(71) Applicant: Intel Corporation, Santa Clara, CA (US)

(72) Inventors: Anjali Singhai Jain, Portland, OR (US); Noam Elati, Zichron Yaakov (IL); Eliel Louzoun, Jerusalem (IL); Daniel Daly, Santa Barbara, CA (US)

(73) Assignee: Intel Corporation, Santa Clara, CA (US)

( * ) Notice: Subject to any disclaimer, the term of this patent is extended or adjusted under 35 U.S.C. 154(b) by 316 days.

(21) Appl. No.: 17/483,458

(22) Filed: Sep. 23, 2021

(65) Prior Publication Data

US 2022/0086226 A1 Mar. 17, 2022

Related U.S. Application Data

(60) Provisional application No. 63/138,305, filed on Jan. 15, 2021.

(51) Int. Cl.
*H04L 67/1097* (2022.01)
*G06F 9/455* (2018.01)
(Continued)

(52) U.S. Cl.
CPC ...... *H04L 67/1097* (2013.01); *G06F 9/45558* (2013.01); *G06F 13/28* (2013.01); *G06F 2009/45595* (2013.01)

(58) Field of Classification Search
CPC . H04L 67/1097; G06F 9/45558; G06F 13/28; G06F 2009/45595;
(Continued)

(56) References Cited

U.S. PATENT DOCUMENTS 10,489,302 B1 * 11/2019 Habusha .......... G06F 9/45558
11,868,872 B1 * 1/2024 Minkin .................. G06F 13/28
(Continued)

FOREIGN PATENT DOCUMENTS

CN  110532208 A  12/2019
WO  WO-2018176359 A1 * 10/2018 .......... G06F 12/109

OTHER PUBLICATIONS

DPDK, "Data Plane Development Kit, 58. VDEV_NETVSC driver", https://doc.dpdk.org/guides/nics/vdev_netvsc.html, 2018, 3 pages.
(Continued)

*Primary Examiner* — David R Lazaro
*Assistant Examiner* — Berhanu Shitayewoldetadik
(74) *Attorney, Agent, or Firm* — Compass IP Law PC

(57) ABSTRACT

Examples described herein relate to a network interface device comprising: a device interface; at least one processor; a direct memory access (DMA) device; and a packet processing circuitry. In some examples, the at least one processor, when operational, is configured to: in connection with a first operation: perform a format translation of a first descriptor from a first format associated with an emulated device to a second format associated with the packet processing circuitry and provide, to the packet processing circuitry, the translated first descriptor. In some examples, the at least one processor, when operational, is configured to: in connection with a second operation: perform a descriptor format translation of a second descriptor from the second format associated with the packet processing circuitry to the first format associated with the emulated software device and provide, to the emulated device, the translated second descriptor.

20 Claims, 19 Drawing Sheets

(51) Int. Cl.
    *G06F 13/28*    (2006.01)
    *G06F 15/16*    (2006.01)
    *H04L 12/851*   (2013.01)
    *H04L 12/911*   (2013.01)
    *H04L 12/927*   (2013.01)
    *H04L 15/16*    (2006.01)
    *H04L 29/06*    (2006.01)
    *H04L 29/08*    (2006.01)

(58) Field of Classification Search
    CPC ......... G06F 2009/45579; G06F 13/105; G06F 2213/3808
    USPC ........................................................ 709/212
    See application file for complete search history.

(56) References Cited

U.S. PATENT DOCUMENTS

| | | | | |
|---|---|---|---|---|
| 2010/0254395 | A1* | 10/2010 | Smith | H04L 61/5076 370/401 |
| 2016/0004548 | A1* | 1/2016 | Suzuki | G06F 9/542 718/1 |
| 2016/0196158 | A1* | 7/2016 | Nipane | G06F 9/45558 718/1 |
| 2018/0173646 | A1* | 6/2018 | Warkentin | G06F 9/45558 |
| 2018/0341547 | A1* | 11/2018 | Bolkhovitin | G06F 13/28 |
| 2019/0114283 | A1* | 4/2019 | Deval | G06F 9/4856 |
| 2019/0243675 | A1* | 8/2019 | Bridgers | G06F 15/17 |
| 2019/0297015 | A1* | 9/2019 | Marolia | H04L 45/742 |
| 2020/0150997 | A1* | 5/2020 | Chang | G06F 9/45558 |
| 2020/0278893 | A1* | 9/2020 | Niell | H04L 67/10 |
| 2020/0319913 | A1* | 10/2020 | Kumar | G06F 9/342 |
| 2021/0103504 | A1* | 4/2021 | Tsuchiya | G06F 9/45558 |
| 2021/0117360 | A1  | 4/2021 | Kutch et al. | |

OTHER PUBLICATIONS

Microsoft Learn, "Live Migration Overview", https://learn.microsoft.com/en-us/windows-server/virtualization/hyper-v/manage/live-migration-overview, Sep. 2020, 1 page.

European First Office Action, (EP Exam Report Article 94(3) EPC), for Patent Application No. 21198818.3, Mailed Feb. 22, 2023, 5 pages.

Anonymous: "Powerful & Smart Network Adapter BlueField System-on-Chip", Jan. 1, 2020 (Jan. 1, 2020), pp. 1-3, https://network.nvidia.com/files/doc-2020/pb-bluefield-smart-nic.pdf, [retrieved on Mar. 3, 2022], 3 pages.

Extended European Search Report for Patent Application No. 21198818.3, Mailed Mar. 15, 2022, 11 pages.

Rizzo, Luigi, "Revisiting Network I/O, APIs: The netmap Framework", ACMQUEUE: Tomorrow's Computing Today, Association for Computing Machinery, New York, NY, US, vol. 10, No. 1, Jan. 17, 2012 (Jan. 17, 2012), pp. 30-39, 10 pages.

European Second Office Action, (EP Exam Report Article 94(3) EPC), for Patent Application No. 21198818.3, Mailed Oct. 23, 2023, 7 pages.

* cited by examiner

VIRTUAL DEVICE PORTABILITY

RELATED APPLICATION

The present application claims the benefit of a priority date of U.S. provisional patent application Ser. No. 63/138,305, filed Jan. 15, 2021, the entire disclosure of which is incorporated herein by reference.

BACKGROUND

Network interface devices such as smartNICs can provide virtualized, hardware independent device interfaces that are created and deleted dynamically by cloud management systems (CMS). These devices can be hardware isolated interfaces in an untrusted compute environment that has been rented out partially (e.g., sub-divided) or rented out wholly as a bare metal machine to a cloud end customer or tenant. Migration of virtual machines from a source platform to another platform may occur in order to balance platform workloads. However, an emulated device interface of a migrated virtual machine may not operate in a target platform, which can lead to limitations on target platforms to which a virtual machine can be migrated.

DETAILED DESCRIPTION

Figure 1:
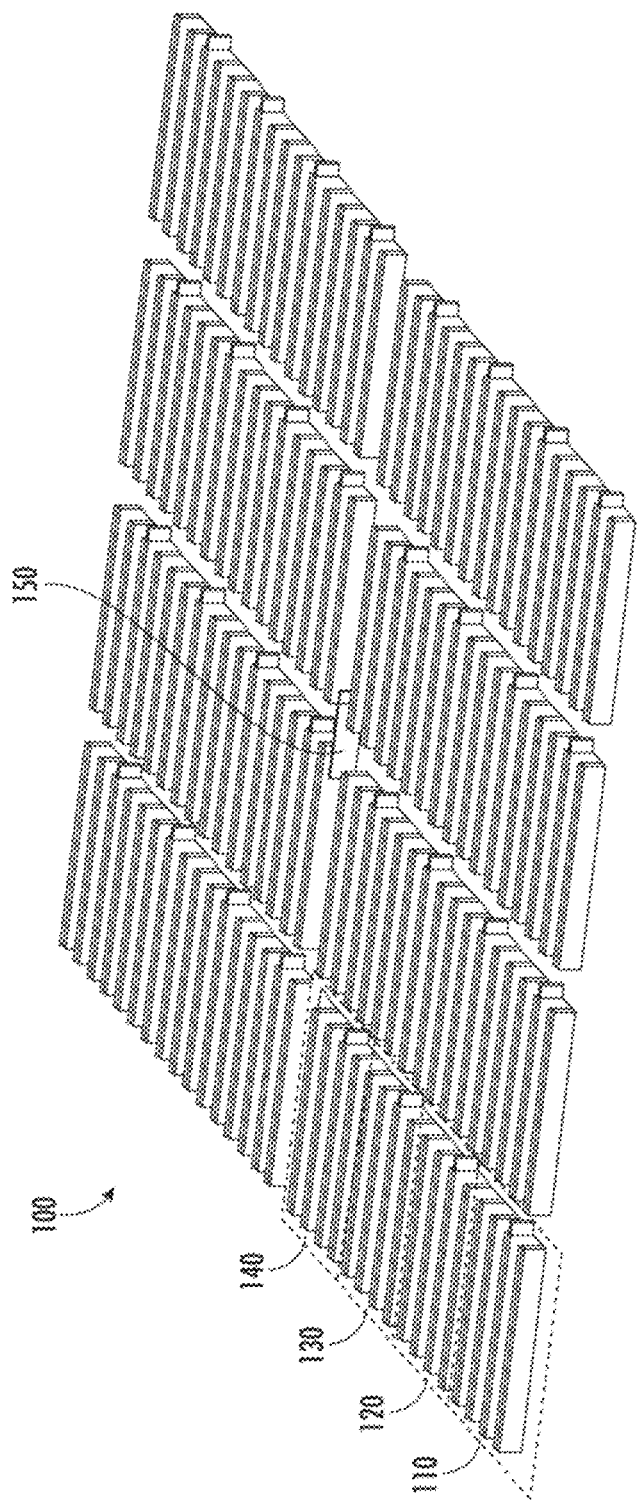
FIG. 1 is a simplified diagram of at least one example of a data center for executing workloads with disaggregated resources.

Some examples include a network interface device with a compute platform and hardware-based packet processor. A host system can execute a virtual environment (e.g., virtual machine or container) or provide a bare metal environment. The host system (e.g., server) can provide instructions to at least one processor of the compute platform on the network interface device to perform packet processing. The host system can utilize a processor-executed emulated software device to provide communication between the network interface device and the virtual or bare metal environment. Instead of, or in addition to performing work by a virtual environment's driver on the host system's processors, such work can be performed by at least one processor of the compute platform on the network interface device. The host system's processors can be freed to perform other work than descriptor translation.

In some examples, for a transmit operation, network interface device's compute platform can perform processor-executed instructions to translate a descriptor from a format provided by the emulated software device to a descriptor format accepted and properly interpreted by the network interface device's packet processor. In some examples, for a receive operation, the network interface device's compute platform can perform processor-executed instructions to translate a descriptor from a format used by the network interface device's packet processor to a descriptor format accepted and properly interpreted by the emulated software device. The hardware-based packet processor can access data from host memory or write data to host memory based on the translated descriptor. Some examples provide a hardware isolated path for data to be copied into or read from the network interface device's compute platform.

Some examples provide flexibility for live migration, booting, or re-booting of virtual environments among platforms with different accepted device descriptor formats and backend recovery functionality used to manage the compute resources with a cloud model. Migrated virtual environments can continue to utilize emulated software devices without modification despite device(s) at a platform to which the virtual environments were migrated-to supporting different descriptor formats than those of the emulated software devices. Note that reference to virtualized environment, microservice, or serverless application can be used interchangeably so that reference to virtualized environment can refer to microservice and/or serverless application, reference to microservice can refer to virtualized environment and/or serverless application, and so forth.

Various examples can apply to a serverless application or function (e.g., Function as a Service (FaaS)) that can be executed by or utilize available resources described herein as well as computing resources at a data center, edge computing device, or fog network device or in disaggregated computing and memory resources. For example, for a serverless application, a cloud service provider dynamically manages allocation and provisioning of servers and a serverless application runs in stateless compute containers that are event-triggered and may last for one invocation. A serverless application can be event-driven, cloud-based application where application development relies on a combination of third-party services, client-side logic and cloud-hosted remote procedure calls. Serverless application can be pay-per-use computing or bare-code where users are charged based on time and computing resources (e.g., CPU, networking, or memory) allocated to run serverless application without associated fees for idle time of computing resources. In some examples, a serverless application or function can be performed by a network infrastructure device (e.g., forwarding element, router, switch, network interface controller) or accelerator, in addition or alternative to use of a server or general purpose computing platform.

Various examples described herein can perform an application composed of microservices, where a microservice runs in its own process and communicates using protocols (e.g., application program interface (API), a Hypertext Transfer Protocol (HTTP) resource API, message service, remote procedure calls (RPC), or Google RPC (gRPC)). Microservices can be independently deployed using centralized management of these services. The management system may be written in different programming languages and use different data storage technologies. A microservice can be characterized by one or more of: use of fine-grained interfaces (to independently deployable services), polyglot programming (e.g., code written in multiple languages to capture additional functionality and efficiency not available in a single language), or lightweight container or virtual machine deployment, and decentralized continuous microservice delivery. One or more microservices can execute on or using any resources described herein, such as resources at least of FIGS. 3-11.

Examples described herein with respect to execution of virtualized environments or environments in bare metal scenarios with process-executed emulated software device can be executed on or utilize disaggregated resources described with respect to FIGS. 3-11 herein. For example, virtualized environments or environments can be boot, re-booted, or migrated for execution or use of different hardware resources.

FIG. 1 depicts a data center in which disaggregated resources may cooperatively execute one or more workloads (e.g., applications on behalf of customers) that includes multiple systems 110, 120, 130, 140, a system being or including one or more rows of racks or trays. Of course, although data center 100 is shown with multiple systems, in some examples, the data center 100 may be embodied as a single system. As described in more detail herein, a rack houses multiple nodes, some of which may be equipped with one or more types of resources (e.g., memory devices, data storage devices, accelerator devices, general purpose processors, GPUs, xPUs, CPUs, field programmable gate arrays (FPGAs), or application-specific integrated circuits (ASICs)). Resources can be logically coupled or aggregated to form a composed node, which can act as, for example, a server to perform a job, workload or microservices.

In the illustrative example, the nodes in systems 110, 120, 130, 140 are connected to multiple system switches (e.g., switches that route data communications to and from nodes within the system). Switches can be positioned at the top of rack (TOR), end of row (EOR), middle of rack (MOR), or other. The system switches, in turn, connect with spine switches 150 that switch communications among systems (e.g., the systems 110, 120, 130, 140) in the data center 100. In some examples, the nodes may be connected with a fabric using standards described herein or proprietary standards. In other examples, the nodes may be connected with other fabrics, such as InfiniBand or Ethernet or optical. As described in more detail herein, resources within nodes in the data center 100 may be allocated to a group (referred to herein as a "managed node") containing resources from one or more nodes to be collectively utilized in the execution of a workload. The workload can execute as if the resources belonging to the managed node were located on the same node. The resources in a managed node may belong to nodes belonging to different racks, and even to different systems 110, 120, 130, 140. As such, some resources of a single node may be allocated to one managed node while other resources of the same node are allocated to a different managed node (e.g., one processor assigned to one managed node and another processor of the same node assigned to a different managed node).

The disaggregation of resources to nodes comprised predominantly of a single type of resource (e.g., compute nodes comprising primarily compute resources, memory nodes containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources. For example, because nodes predominantly contain resources of a particular type, resources of a given type can be upgraded independently of other resources. Additionally, because different resource types (processors, memory, storage, accelerators, etc.) typically have different refresh rates, greater resource utilization, and reduced total cost of ownership may be achieved. For example, a data center operator can upgrade the processors throughout their facility by only swapping out the compute nodes. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
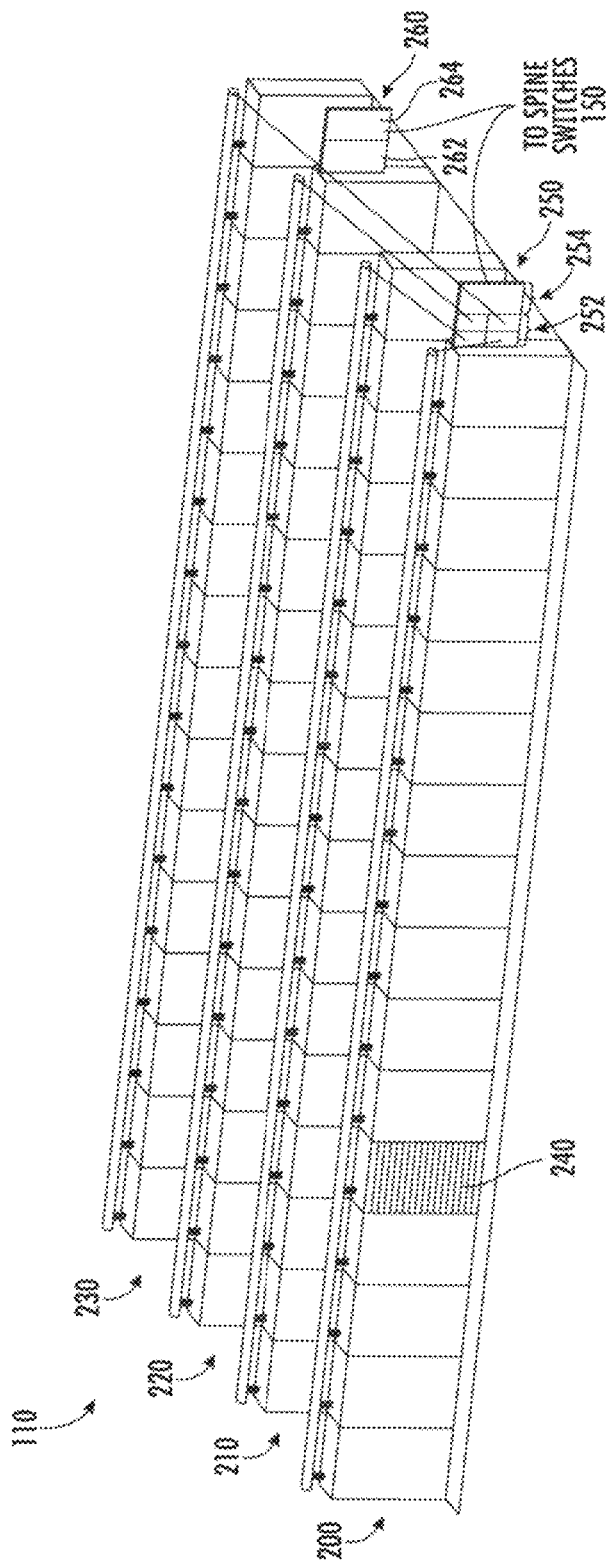
FIG. 2 is a simplified diagram of at least one example of a system that may be included in a data center.

FIG. 2 depicts a system. A system can include a set of rows 200, 210, 220, 230 of racks 240. Rack 240 may house multiple nodes (e.g., sixteen nodes) and provide power and data connections to the housed nodes, as described in more detail herein. In the illustrative example, the racks in rows 200, 210, 220, 230 are connected to multiple system switches 250, 260. The system switch 250 includes a set of ports 252 to which the nodes of the racks of the system 110 are connected and another set of ports 254 that connect the system 110 to the spine switches 150 to provide connectivity to other systems in the data center 100. Similarly, the system switch 260 includes a set of ports 262 to which the nodes of the racks of the system 110 are connected and a set of ports 264 that connect the system 110 to the spine switches 150. As such, the use of the pair of switches 250, 260 provides an amount of redundancy to the system 110. For example, if either of the switches 250, 260 fails, the nodes in the system 110 may still maintain data communication with the remainder of the data center 100 (e.g., nodes of other systems) through the other switch 250, 260. Furthermore, in the illustrative example, the switches 150, 250, 260 may be embodied as dual-mode optical switches, capable of routing both Ethernet protocol communications carrying Internet Protocol (IP) packets and communications according to a second, high-performance link-layer protocol (e.g., PCI Express or Compute Express Link) via optical signaling media of an optical fabric.

It should be appreciated that the other systems 120, 130, 140 (as well as additional systems of the data center 100) may be similarly structured as, and have components similar to, the system 110 shown in and described in regard to FIG. 2 (e.g., a system may have rows of racks housing multiple nodes as described above). Additionally, while two system switches 250, 260 are shown, it should be understood that in other examples, systems 110, 120, 130, 140 may be connected to a different number of system switches, providing even more failover capacity. Of course, in other examples, systems may be arranged differently than the rows-of-racks configuration shown in FIGS. 1-2. For example, a system may be embodied as multiple sets of racks in which a set of racks is arranged radially, e.g., the racks are equidistant from a center switch.

Figure 3:
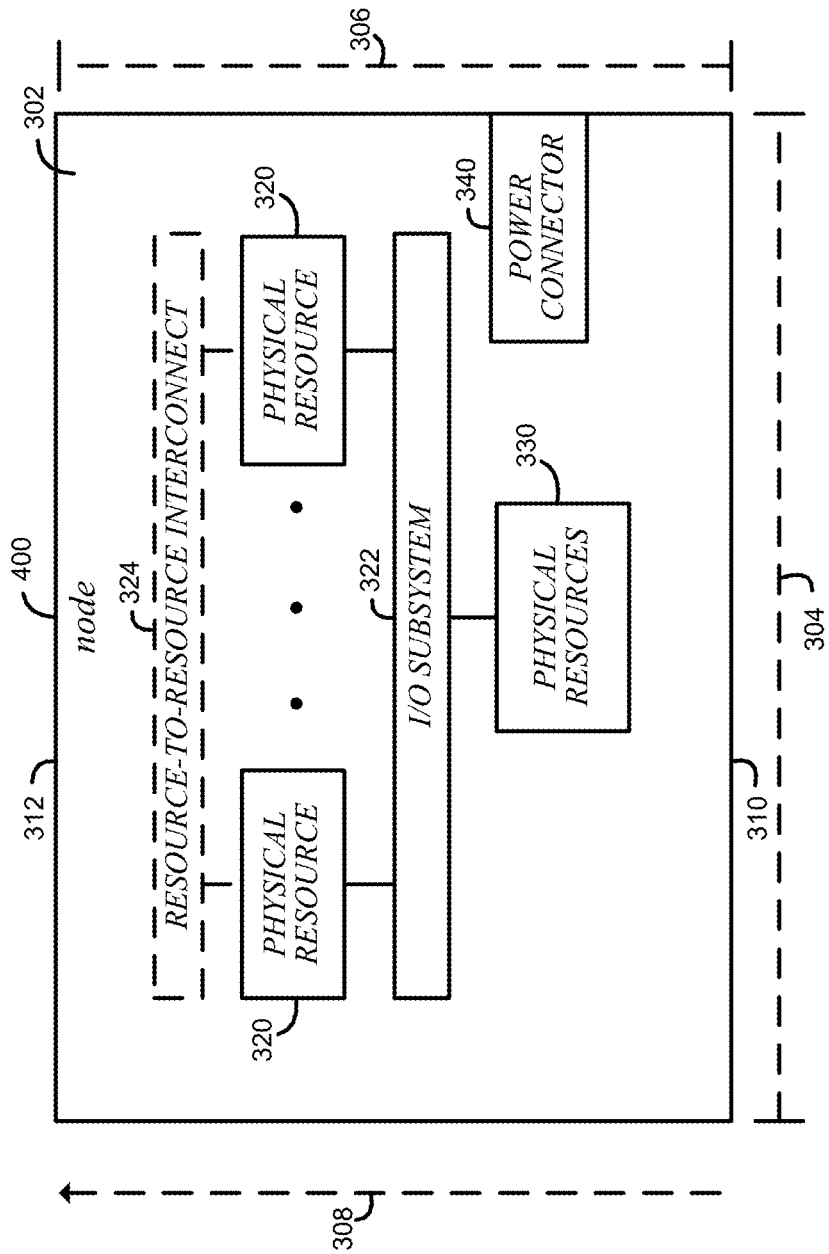
FIG. 3 is a simplified block diagram of at least one example of a top side of a node.

Referring now to FIG. 3, node 400, in the illustrative example, is configured to be mounted in a corresponding rack 240 of the data center 100 as discussed above. In some examples, node 400 may be optimized or otherwise configured for performing particular tasks, such as compute tasks, acceleration tasks, data storage tasks, etc. For example, the node 400 may be embodied as a compute node 500 as discussed below in regard to FIG. 5, an accelerator node 600 as discussed below in regard to FIG. 6, a storage node 700 as discussed below in regard to FIG. 7, or as a node optimized or otherwise configured to perform other specialized tasks, such as a memory node 800, discussed below in regard to FIG. 8. For example, one or more microservices can execute on or using node 400, node 500, accelerator node 600, storage node 700, and/or memory node 800.

Although two physical resources 320 are shown in FIG. 3, it should be appreciated that the node 400 may include one, two, or more physical resources 320 in other examples. The physical resources 320 may be embodied as any type of processor, controller, or other compute circuit capable of performing various tasks such as compute functions and/or controlling the functions of the node 400 depending on, for example, the type or intended functionality of the node 400. For example, as discussed in more detail below, the physical resources 320 may be embodied as high-performance processors in examples in which the node 400 is embodied as a compute node, as accelerator co-processors or circuits in examples in which the node 400 is embodied as an accelerator node, storage controllers in examples in which the node 400 is embodied as a storage node, or a set of memory devices in examples in which the node 400 is embodied as a memory node.

The node 400 also includes one or more additional physical resources 330 mounted to circuit board substrate 302. In the illustrative example, the additional physical resources include a network interface controller (NIC) as discussed in more detail below. Of course, depending on the type and functionality of the node 400, the physical resources 330 may include additional or other electrical components, circuits, and/or devices in other examples.

The physical resources 320 can be communicatively coupled to the physical resources 330 via an input/output (I/O) subsystem 322. The I/O subsystem 322 may be embodied as circuitry and/or components to facilitate input/output operations with the physical resources 320, the physical resources 330, and/or other components of the node 400. For example, the I/O subsystem 322 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative example for memory system, the I/O subsystem 322 is embodied as, or otherwise includes, a double data rate 4 (DDR4) data bus or a DDR5 data bus.

In some examples, the node 400 may also include a resource-to-resource interconnect 324. The resource-to-resource interconnect 324 may be embodied as any type of communication interconnect capable of facilitating resource-to-resource communications. In the illustrative example, the resource-to-resource interconnect 324 is embodied as a high-speed point-to-point interconnect (e.g., faster than the I/O subsystem 322). For example, the resource-to-resource interconnect 324 may be embodied as a QuickPath Interconnect (QPI), an UltraPath Interconnect (UPI), PCI express (PCIe), Compute Express Link (CXL), or other high-speed point-to-point interconnect utilized for resource-to-resource communications.

The node 400 also includes a power connector 340 configured to mate with a corresponding power connector of the rack 240 when the node 400 is mounted in the corresponding rack 240. The node 400 receives power from a power supply of the rack 240 via the power connector 340 to supply power to the various electrical components of the node 400. In some examples, the node 400 includes local power supply (e.g., an on-board power supply) to provide power to the electrical components of the node 400. In some examples, the node 400 does not include any local power supply (e.g., an on-board power supply) to provide power to the electrical components of the node 400. The exclusion of a local or on-board power supply facilitates the reduction in the overall footprint of the circuit board substrate 302, which may increase the thermal cooling characteristics of the various electrical components mounted on the circuit board substrate 302 as discussed above. In some examples, voltage regulators are placed on circuit board substrate 302 directly opposite of the processors 520 (see FIG. 5), and power is routed from the voltage regulators to the processors 520 by vias extending through the circuit board substrate 302.

Figure 4:
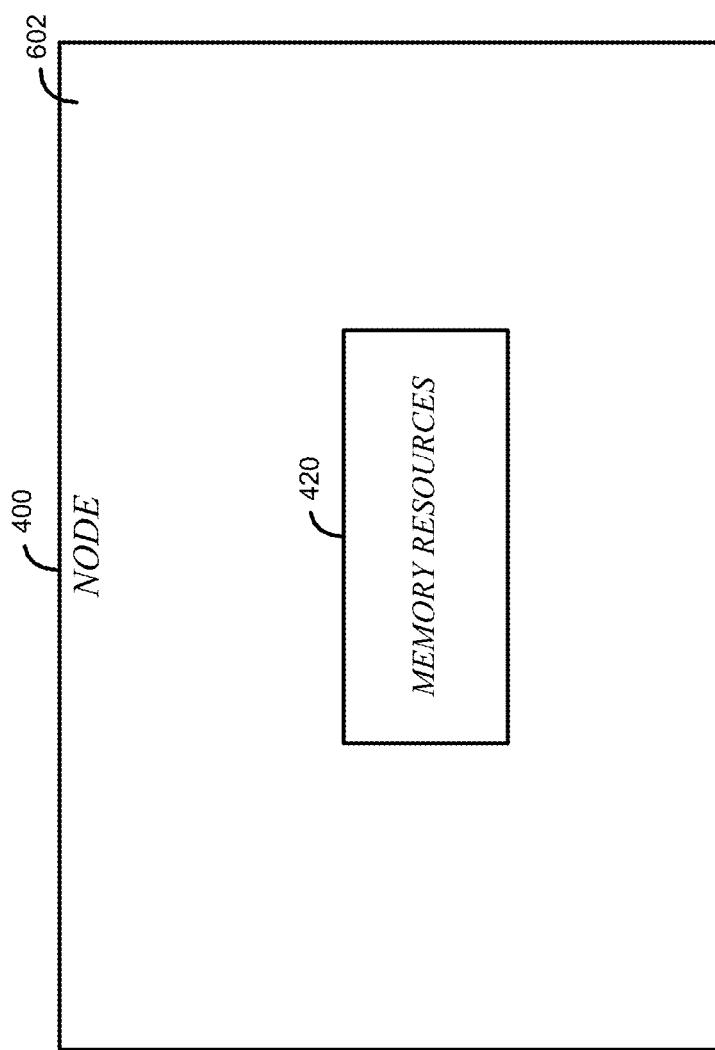
FIG. 4 is a simplified block diagram of at least one example of a bottom side of a node.

Referring now to FIG. 4, in addition to the physical resources 330 mounted on circuit board substrate 302, the node 400 also includes one or more memory devices 420. The physical resources 320 can be communicatively coupled to memory devices 420 via the I/O subsystem 322. For example, the physical resources 320 and the memory devices 420 may be communicatively coupled by one or more vias extending through the circuit board substrate 302. A physical resource 320 may be communicatively coupled to a different set of one or more memory devices 420 in some examples. Alternatively, in other examples, physical resource 320 may be communicatively coupled to memory device 420.

The memory devices 420 may be embodied as any type of memory device capable of storing data for the physical resources 320 during operation of the node 400, such as any type of volatile (e.g., dynamic random access memory (DRAM), etc.) or non-volatile memory.

In one example, the memory device is a block addressable memory device, such as those based on NAND or NOR technologies, for example, multi-threshold level NAND flash memory and NOR flash memory. A block can be any size such as but not limited to 2 KB, 4 KB, 5 KB, and so forth. A memory device may also include next-generation nonvolatile devices, such as Intel Optane® memory or other byte addressable write-in-place nonvolatile memory devices (e.g., memory devices that use chalcogenide glass), multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory. The memory device may refer to the die itself and/or to a packaged memory product. In some examples, the memory device may comprise a transistor-less stackable cross point architecture in which memory cells sit at the intersection of word lines and bit lines and are individually addressable and in which bit storage is based on a change in bulk resistance.

Figure 5:
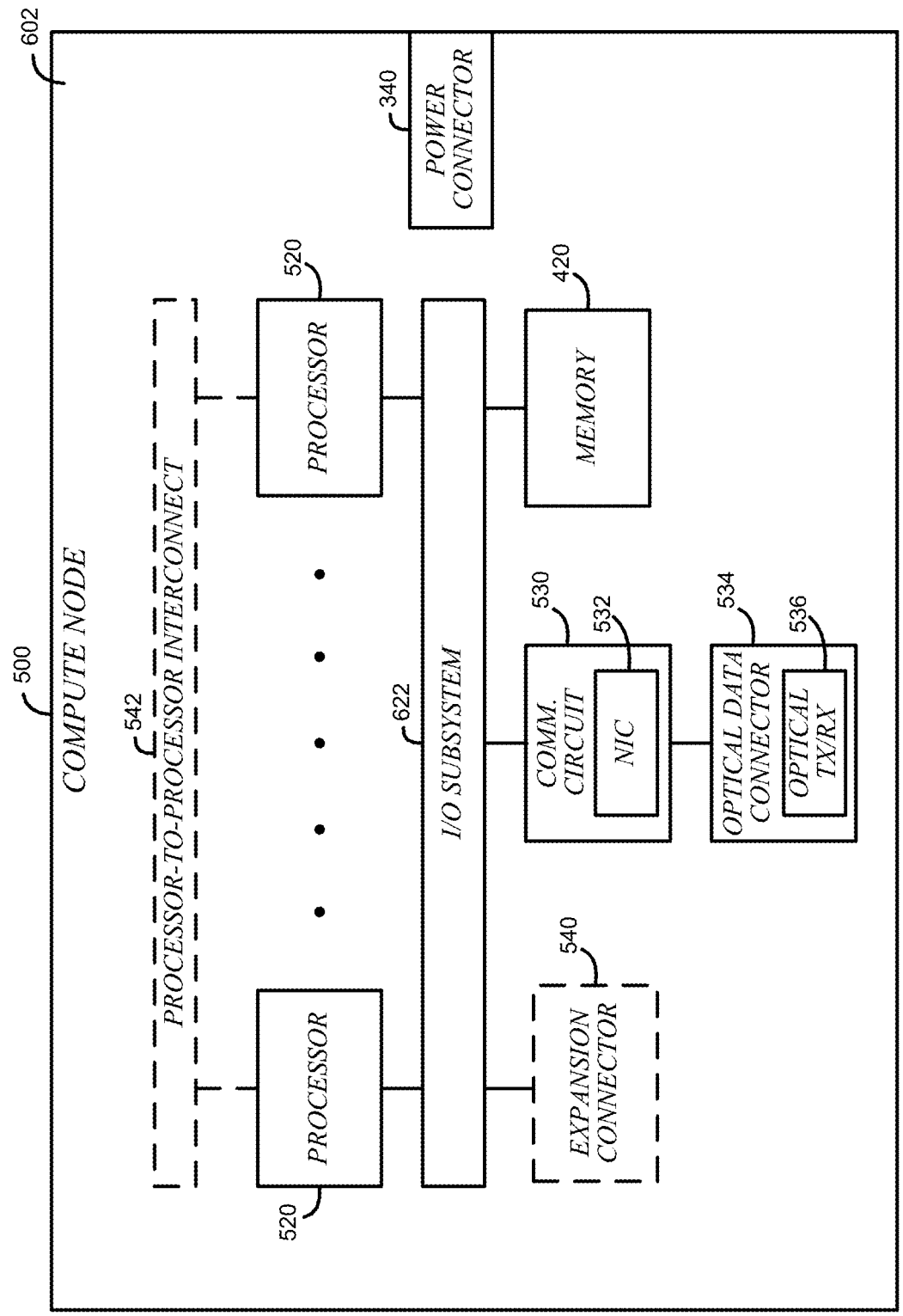
FIG. 5 is a simplified block diagram of at least one example of a compute node.

Referring now to FIG. 5, in some examples, the node 400 may be embodied as a compute node 500. The compute node 500 can be configured to perform compute tasks. Of course, as discussed above, the compute node 500 may rely on other nodes, such as acceleration nodes and/or storage nodes, to perform compute tasks. In the illustrative compute node 500, the physical resources 320 are embodied as processors 520. Although only two processors 520 are shown in FIG. 5, it should be appreciated that the compute node 500 may include additional processors 520 in other examples. Illustratively, the processors 520 are embodied as high-performance processors 520 and may be configured to operate at a relatively high power rating.

In some examples, the compute node 500 may also include a processor-to-processor interconnect 542. Processor-to-processor interconnect 542 may be embodied as any type of communication interconnect capable of facilitating processor-to-processor interconnect 542 communications. In the illustrative example, the processor-to-processor interconnect 542 is embodied as a high-speed point-to-point interconnect (e.g., faster than the I/O subsystem 322). For example, the processor-to-processor interconnect 542 may be embodied as a QuickPath Interconnect (QPI), an Ultra-Path Interconnect (UPI), or other high-speed point-to-point interconnect utilized for processor-to-processor communications (e.g., PCIe or CXL).

The compute node 500 also includes a communication circuit 530. The illustrative communication circuit 530 includes a network interface controller (NIC) 532, which may also be referred to as a host fabric interface (HFI). The NIC 532 may be embodied as, or otherwise include, any type of integrated circuit, discrete circuits, controller chips, chipsets, add-in-boards, daughtercards, network interface cards, or other devices that may be used by the compute node 500 to connect with another compute device (e.g., with other nodes 400). In some examples, the NIC 532 may be embodied as part of a system-on-a-chip (SoC) that includes one or more processors, or included on a multichip package that also contains one or more processors. In some examples, the NIC 532 may include a local processor (not shown) and/or a local memory (not shown) that are both local to the NIC 532. In such examples, the local processor of the NIC 532 may be capable of performing one or more of the functions of the processors 520. Additionally, or alternatively, in such examples, the local memory of the NIC 532 may be integrated into one or more components of the compute node at the board level, socket level, chip level, and/or other levels. In some examples, a network interface includes a network interface controller or a network interface card. In some examples, a network interface can include one or more of a network interface controller (NIC) 532, a host fabric interface (HFI), a host bus adapter (HBA), network interface connected to a bus or connection (e.g., PCIe, CXL, DDR, and so forth). In some examples, a network interface can be part of a switch or a system-on-chip (SoC).

Some examples of a NIC 532 are part of an Infrastructure Processing Unit (IPU) or data processing unit (DPU) or utilized by an IPU or DPU. An IPU or DPU can include a network interface, memory devices, and one or more programmable or fixed function processors (e.g., CPU or XPU) to perform offload of operations that could have been performed by a host CPU or XPU or remote CPU or XPU. In some examples, the IPU or DPU can perform virtual switch operations, manage storage transactions (e.g., compression, cryptography, virtualization), and manage operations performed on other IPUs, DPUs, servers, or devices.

The communication circuit 530 is communicatively coupled to an optical data connector 534. The optical data connector 534 is configured to mate with a corresponding optical data connector of a rack when the compute node 500 is mounted in the rack. Illustratively, the optical data connector 534 includes a plurality of optical fibers which lead from a mating surface of the optical data connector 534 to an optical transceiver 536. The optical transceiver 536 is configured to convert incoming optical signals from the rack-side optical data connector to electrical signals and to convert electrical signals to outgoing optical signals to the rack-side optical data connector. Although shown as forming part of the optical data connector 534 in the illustrative example, the optical transceiver 536 may form a portion of the communication circuit 530 in other examples.

In some examples, the compute node 500 may also include an expansion connector 540. In such examples, the expansion connector 540 is configured to mate with a corresponding connector of an expansion circuit board substrate to provide additional physical resources to the compute node 500. The additional physical resources may be used, for example, by the processors 520 during operation of the compute node 500. The expansion circuit board substrate may be substantially similar to the circuit board substrate 302 discussed above and may include various electrical components mounted thereto. The particular electrical components mounted to the expansion circuit board substrate may depend on the intended functionality of the expansion circuit board substrate. For example, the expansion circuit board substrate may provide additional compute resources, memory resources, and/or storage resources. As such, the additional physical resources of the expansion circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits. Note that reference to GPU or CPU herein can in addition or alternatively refer to an XPU or xPU. An xPU can include one or more of: a GPU, ASIC, FPGA, or accelerator device.

Figure 6:
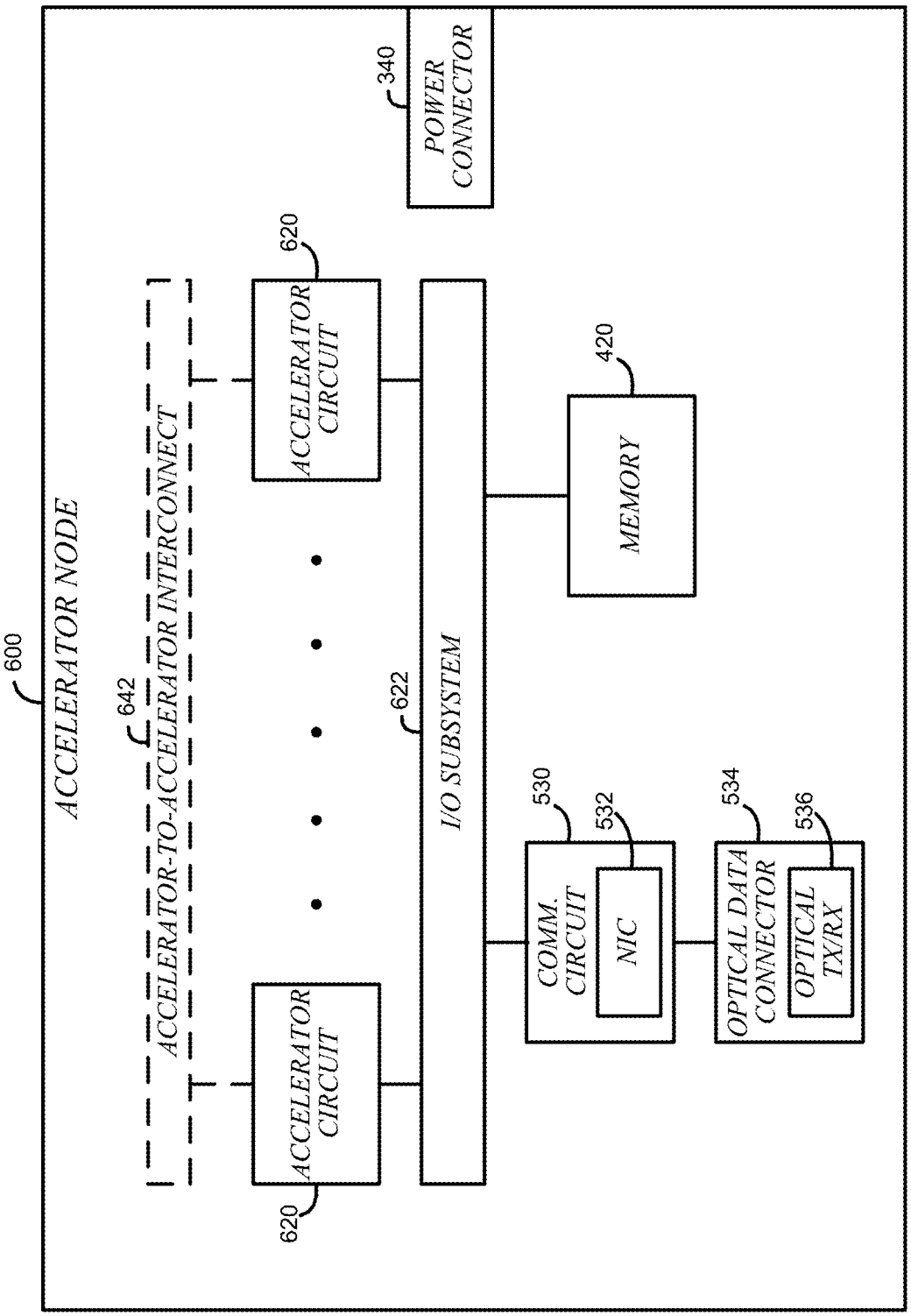
FIG. 6 is a simplified block diagram of at least one example of an accelerator node usable in a data center.

Referring now to FIG. 6, in some examples, the node 400 may be embodied as an accelerator node 600. The accelerator node 600 is configured to perform specialized compute tasks, such as machine learning, encryption, hashing, or other computational-intensive task. In some examples, for example, a compute node 500 may offload tasks to the accelerator node 600 during operation. The accelerator node 600 includes various components similar to components of the node 400 and/or compute node 500, which have been identified in FIG. 6 using the same reference numbers.

In the illustrative accelerator node 600, the physical resources 320 are embodied as accelerator circuits 620. Although only two accelerator circuits 620 are shown in FIG. 6, it should be appreciated that the accelerator node 600 may include additional accelerator circuits 620 in other examples. The accelerator circuits 620 may be embodied as any type of processor, co-processor, compute circuit, or other device capable of performing compute or processing operations. For example, the accelerator circuits 620 may be embodied as, for example, central processing units, cores, field programmable gate arrays (FPGA), application-specific integrated circuits (ASICs), programmable control logic (PCL), security co-processors, graphics processing units (GPUs), neuromorphic processor units, quantum computers, machine learning circuits, programmable processing pipeline (e.g., programmable by P4, C, Python, Broadcom Network Programming Language (NPL), or x86 compatible executable binaries or other executable binaries). Processors, FPGAs, other specialized processors, controllers, devices, and/or circuits can be used utilized for packet processing or packet modification. Ternary content-addressable memory (TCAM) can be used for parallel match-action or look-up operations on packet header content.

In some examples, the accelerator node 600 may also include an accelerator-to-accelerator interconnect 642. Similar to the resource-to-resource interconnect 324 of the node 300 discussed above, the accelerator-to-accelerator interconnect 642 may be embodied as any type of communication interconnect capable of facilitating accelerator-to-accelerator communications. In the illustrative example, the accelerator-to-accelerator interconnect 642 is embodied as a high-speed point-to-point interconnect (e.g., faster than the I/O subsystem 322). For example, the accelerator-to-accelerator interconnect 642 may be embodied as a QuickPath Interconnect (QPI), an UltraPath Interconnect (UPI), or other high-speed point-to-point interconnect utilized for accelerator-to-accelerator communications. In some examples, the accelerator circuits 620 may be daisy-chained with a primary accelerator circuit 620 connected to the NIC 532 and memory 420 through the I/O subsystem 322 and a secondary accelerator circuit 620 connected to the NIC 532 and memory 420 through a primary accelerator circuit 620.

Figure 7:
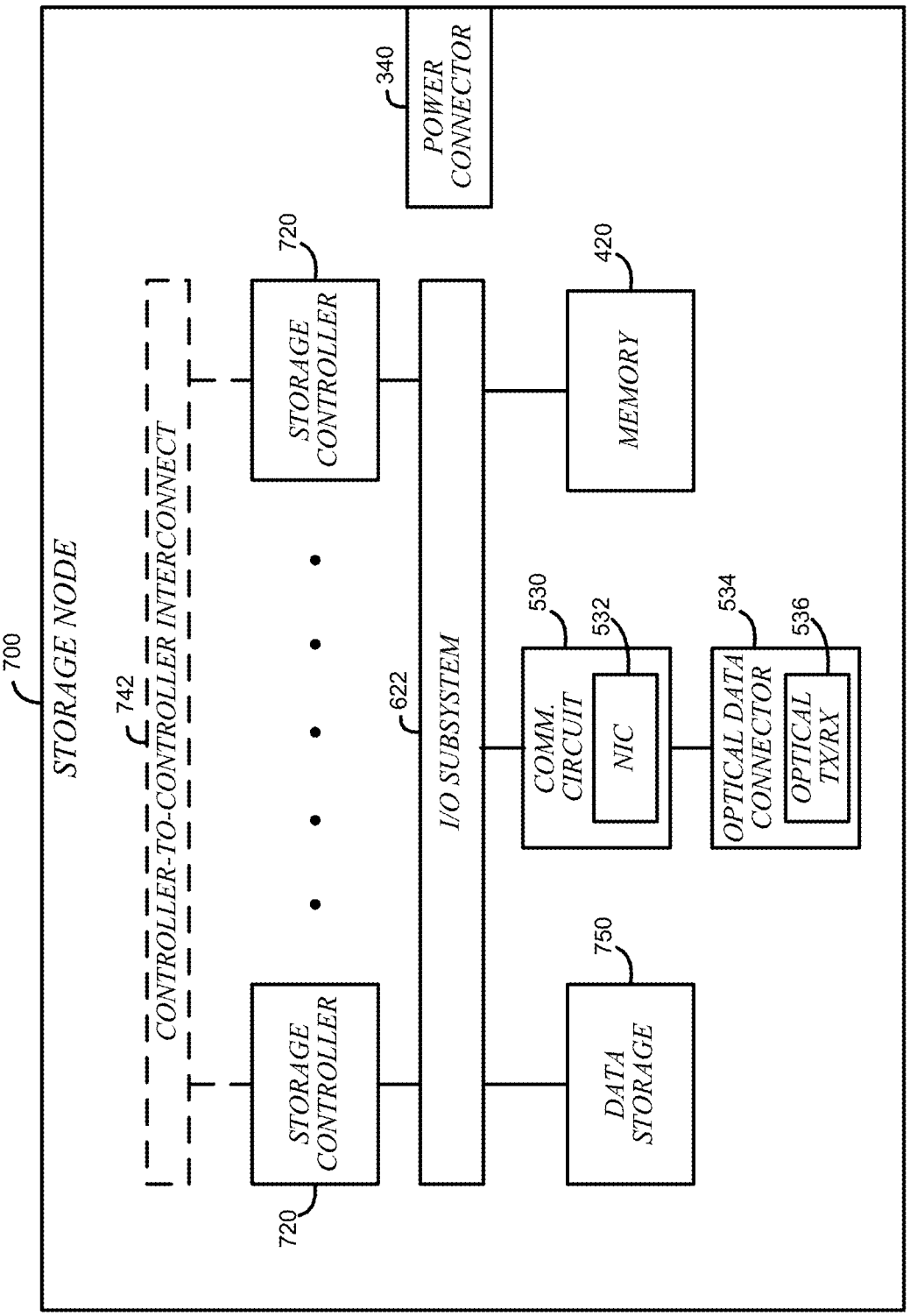
FIG. 7 is a simplified block diagram of at least one example of a storage node usable in a data center.

Referring now to FIG. 7, in some examples, the node 400 may be embodied as a storage node 700. The storage node 700 is configured in some examples to store data in a data storage 750 local to the storage node 700. For example, during operation, a compute node 500 or an accelerator node 600 may store and retrieve data from the data storage 750 of the storage node 700. The storage node 700 includes various components similar to components of the node 400 and/or the compute node 500, which have been identified in FIG. 7 using the same reference numbers.

In the illustrative storage node 700, the physical resources 320 are embodied as storage controllers 720. Although only two storage controllers 720 are shown in FIG. 7, it should be appreciated that the storage node 700 may include additional storage controllers 720 in other examples. The storage controllers 720 may be embodied as any type of processor, controller, or control circuit capable of controlling the storage and retrieval of data into/from the data storage 750 based on requests received via the communication circuit 530 or other components. In the illustrative example, the storage controllers 720 are embodied as relatively low-power processors or controllers.

In some examples, the storage node 700 may also include a controller-to-controller interconnect 742. Similar to the resource-to-resource interconnect 324 of the node 400 discussed above, the controller-to-controller interconnect 742 may be embodied as any type of communication interconnect capable of facilitating controller-to-controller communications. In the illustrative example, the controller-to-controller interconnect 742 is embodied as a high-speed point-to-point interconnect (e.g., faster than the I/O subsystem 322). For example, the controller-to-controller interconnect 742 may be embodied as a QuickPath Interconnect (QPI), an UltraPath Interconnect (UPI), or other high-speed point-to-point interconnect utilized for controller-to-controller communications.

Figure 8:
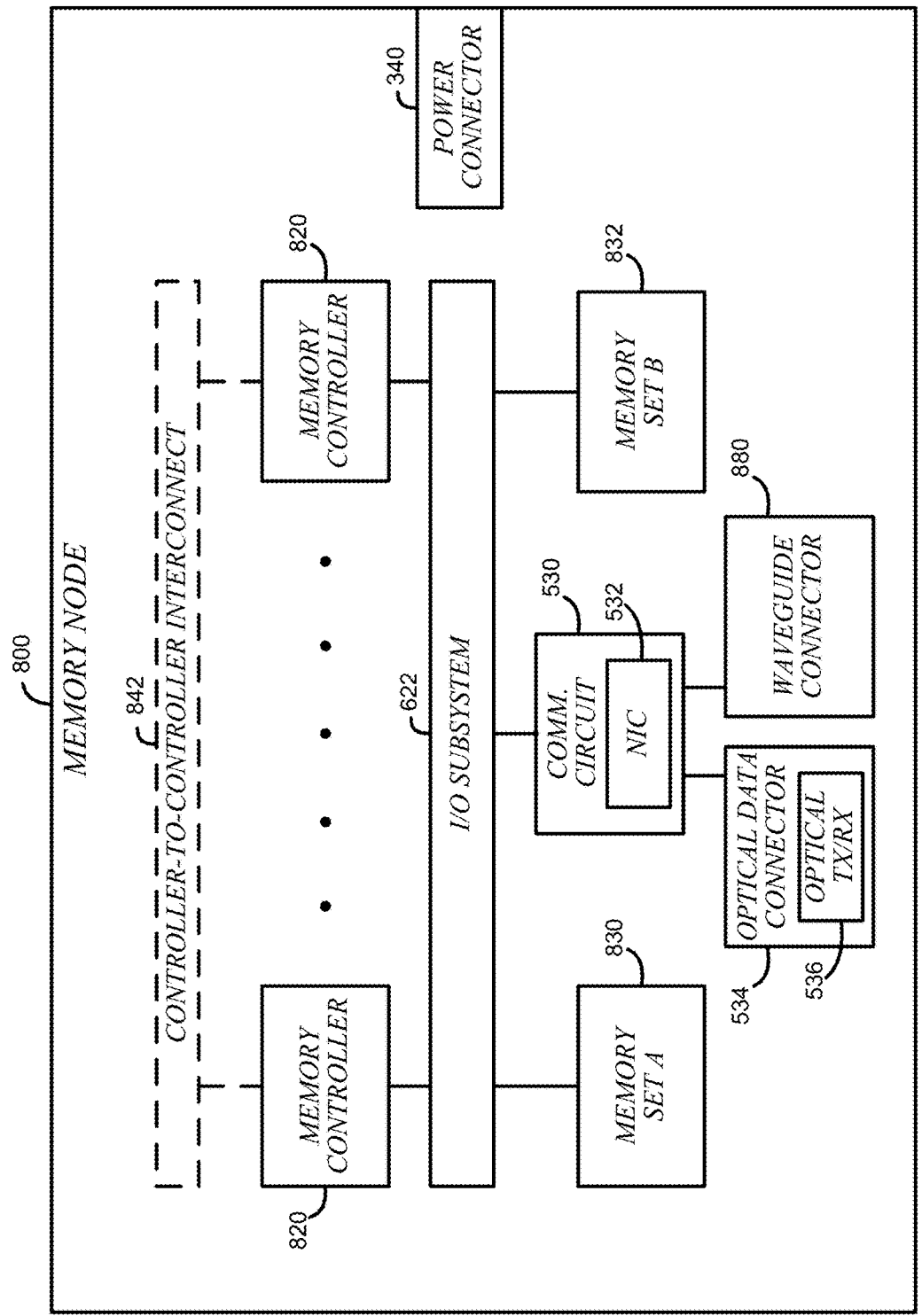
FIG. 8 is a simplified block diagram of at least one example of a memory node usable in a data center.

Referring now to FIG. 8, in some examples, the node 400 may be embodied as a memory node 800. The memory node 800 is configured to provide other nodes 400 (e.g., compute nodes 500, accelerator nodes 600, etc.) with access to a pool of memory (e.g., in two or more sets 830, 832 of memory devices 420) local to the storage node 700. Also, additional external memory sets can be facilitated using communication circuit 530 and memory sets on memory node(s) located in other physical nodes (not shown). For example, during operation, a compute node 500 or an accelerator node 600 may remotely write to and/or read from one or more of the memory sets 830, 832 of the memory node 800 using a logical address space that maps to physical addresses in the memory sets 830, 832.

In the illustrative memory node 800, the physical resources 320 are embodied as memory controllers 820. Although only two memory controllers 820 are shown in FIG. 8, it should be appreciated that the memory node 800 may include additional memory controllers 820 in other examples. The memory controllers 820 may be embodied as any type of processor, controller, or control circuit capable of controlling the writing and reading of data into the memory sets 830, 832 based on requests received via the communication circuit 530. In the illustrative example, memory controller 820 is connected to a corresponding memory set 830, 832 to write to and read from memory devices 420 within the corresponding memory set 830, 832 and enforce a permissions (e.g., read, write, etc.) associated with node 400 that has sent a request to the memory node 800 to perform a memory access operation (e.g., read or write).

In some examples, the memory node 800 may also include a controller-to-controller interconnect 842. Similar to the resource-to-resource interconnect 324 of the node 400 discussed above, the controller-to-controller interconnect 842 may be embodied as any type of communication interconnect capable of facilitating controller-to-controller communications. In the illustrative example, the controller-to-controller interconnect 842 is embodied as a high-speed point-to-point interconnect (e.g., faster than the I/O subsystem 322). For example, the controller-to-controller interconnect 842 may be embodied as a QuickPath Interconnect (QPI), an UltraPath Interconnect (UPI), or other high-speed point-to-point interconnect utilized for controller-to-controller communications. As such, in some examples, a memory controller 820 may access, through the controller-to-controller interconnect 842, memory that is within the memory set 832 associated with another memory controller 820. In some examples, a scalable memory controller is made of multiple smaller memory controllers, referred to herein as "chiplets", on a memory node (e.g., the memory node 800). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some examples, the memory controllers 820 may implement a memory interleave (e.g., one memory address is mapped to the memory set 830, the next memory address is mapped to the memory set 832, and the third address is mapped to the memory set 830, etc.). The interleaving may be managed within the memory controllers 820, or from CPU sockets (e.g., of the compute node 500) across network links to the memory sets 830, 832, and may improve the latency and bandwidth associated with performing memory access operations as compared to accessing contiguous memory addresses from the same memory device.

Further, in some examples, the memory node 800 may be connected to one or more other nodes 400 (e.g., in the same rack 240 or an adjacent rack 240) through a waveguide, using the waveguide connector 880. Using a waveguide may provide high throughput access to the memory pool (e.g., the memory sets 830, 832) to another node (e.g., a node 400 in the same rack 240 or an adjacent rack 240 as the memory node 800) without adding to the load on the optical data connector 534.

Figure 9:
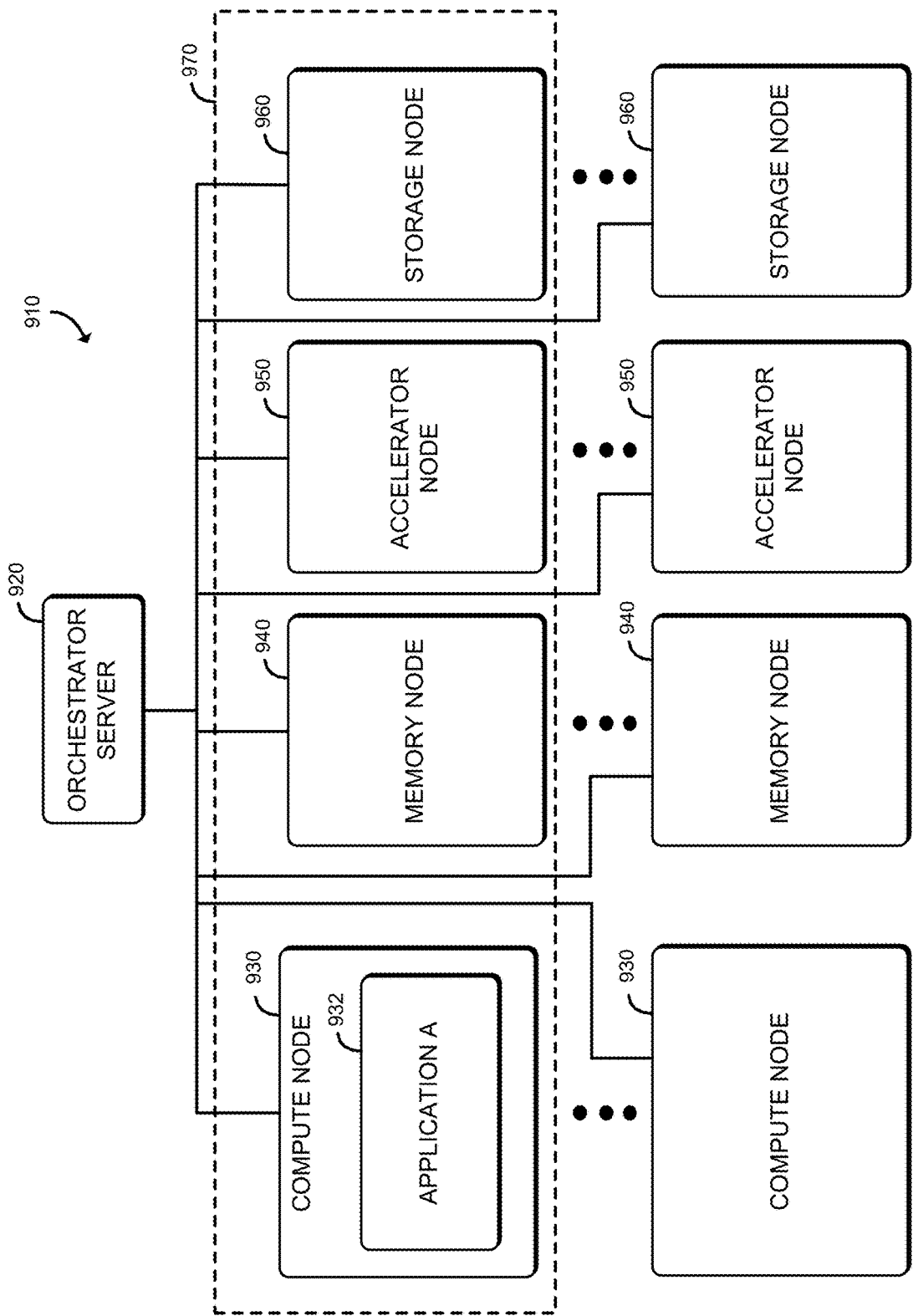
FIG. 9 depicts a system for executing one or more workloads.

Referring now to FIG. 9, a system for executing one or more workloads (e.g., applications or microservices) may be implemented. In the illustrative example, the system 910 includes an orchestrator server 920, which may be embodied as a managed node comprising a compute device (e.g., a processor 520 on a compute node 500) executing management software (e.g., a cloud operating environment, such as OpenStack) that is communicatively coupled to multiple nodes 400 including a large number of compute nodes 930 (e.g., similar to the compute node 500), memory nodes 940 (e.g., similar to the memory node 800), accelerator nodes 950 (e.g., similar to the accelerator node 600), and storage nodes 960 (e.g., similar to the storage node 700). One or more of the nodes 930, 940, 950, 960 may be grouped into a managed node 970, such as by the orchestrator server 920, to collectively perform a workload (e.g., an application 932 executed in a virtual machine or in a container). While orchestrator node 920 is shown as a single entity, alternatively or additionally, its functionality can be distributed across multiple instances and physical locations.

The managed node 970 may be embodied as an assembly of physical resources 320, such as processors 520, memory resources 420, accelerator circuits 620, or data storage 750, from the same or different nodes 400. Further, the managed node may be established, defined, or "spun up" by the orchestrator server 920 at the time a workload is to be assigned to the managed node, and may exist regardless of whether a workload is presently assigned to the managed node. In the illustrative example, the orchestrator server 920 may selectively allocate and/or deallocate physical resources 320 from the nodes 400 and/or add or remove one or more nodes 400 from the managed node 970 as a function of quality of service (QoS) targets (e.g., a target throughput, a target latency, a target number or instructions per second, etc.) associated with a service level agreement or class of service (COS or CLOS) for the workload (e.g., the application 932). In doing so, the orchestrator server 920 may receive telemetry data indicative of performance conditions (e.g., throughput, latency, instructions per second, etc.) in node 400 of the managed node 970 and compare the telemetry data to the quality-of-service targets to determine whether the quality of service targets are being satisfied. The orchestrator server 920 may additionally determine whether one or more physical resources may be deallocated from the managed node 970 while still satisfying the QoS targets, thereby freeing up those physical resources for use in another managed node (e.g., to execute a different workload). Alternatively, if the QoS targets are not presently satisfied, the orchestrator server 920 may determine to dynamically allocate additional physical resources to assist in the execution of the workload (e.g., the application 932) while the workload is executing. Similarly, the orchestrator server 920 may determine to dynamically deallocate physical resources from a managed node if the orchestrator server 920 determines that deallocating the physical resource would result in QoS targets still being met.

Additionally, in some examples, the orchestrator server 920 may identify trends in the resource utilization of the workload (e.g., the application 932), such as by identifying phases of execution (e.g., time periods in which different operations, having different resource utilizations characteristics, are performed) of the workload (e.g., the application 932) and pre-emptively identifying available resources in the data center and allocating them to the managed node 970 (e.g., within a predefined time period of the associated phase beginning). In some examples, the orchestrator server 920 may model performance based on various latencies and a distribution scheme to place workloads among compute nodes and other resources (e.g., accelerator nodes, memory nodes, storage nodes) in the data center. For example, the orchestrator server 920 may utilize a model that accounts for the performance, including optionally previously collected historical performance, of resources on the nodes 400 (e.g., FPGA performance, memory access latency, etc.) and the performance (e.g., congestion, latency, bandwidth) of the path through the network to the resource (e.g., FPGA). As such, the orchestrator server 920 may determine which resource(s) should be used with which workloads based on the total latency associated with potential resource available in the data center 100 (e.g., the latency associated with the performance of the resource itself in addition to the latency associated with the path through the network between the compute node executing the workload and the node 400 on which the resource is located).

In some examples, the orchestrator server 920 may generate a map of heat generation in the data center 100 using telemetry data (e.g., temperatures, fan speeds, etc.) reported from the nodes 400 and allocate resources to managed nodes as a function of the map of heat generation and predicted heat generation associated with different workloads, to maintain a target temperature and heat distribution in the data center 100. Additionally or alternatively, in some examples, the orchestrator server 920 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads with others, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 920 may determine the differences based on the telemetry data stored in the hierarchical model and factor the differences into a prediction of future resource utilization of a workload if the workload is reassigned from one managed node to another managed node, to accurately balance resource utilization in the data center 100. In some examples, the orchestrator server 920 may identify patterns in resource utilization phases of the workloads and use the patterns to predict future resource utilization of the workloads.

To reduce the computational load on the orchestrator server 920 and the data transfer load on the network, in some examples, the orchestrator server 920 may send self-test information to the nodes 400 to enable node 400 to locally (e.g., on the node 400) determine whether telemetry data generated by the node 400 satisfies one or more conditions (e.g., an available capacity that satisfies a predefined threshold, a temperature that satisfies a predefined threshold, etc.). Node 400 may then report back a simplified result (e.g., yes or no) to the orchestrator server 920, which the orchestrator server 920 may utilize in determining the allocation of resources to managed nodes.

Examples described herein can select a storage node 700 or memory node 800 to store data for access by node 400, node 500, or accelerator node 600 to reduce a transit time of data to meet applicable service level agreement (SLA) parameters. Nodes 400 to 800 can be used in a data center or disaggregated composite nodes. The techniques described herein can apply to both disaggregated and traditional server architectures. A traditional server can include a CPU, XPU, one or more memory devices, networking communicatively coupled to one or more circuit boards within a server.

Edge Network

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in a high-performance compute data center or cloud installation; a designated edge node server, an enterprise server, a roadside server, a telecom central office; or a local or peer at-the-edge device being served consuming edge services).

With the illustrative edge networking systems described below, computing and storage resources are moved closer to the edge of the network (e.g., closer to the clients, endpoint devices, or "things"). By moving the computing and storage resources closer to the device producing or using the data, various latency, compliance, and/or monetary or resource cost constraints may be achievable relative to a standard networked (e.g., cloud computing) system. To do so, in some examples, pools of compute, memory, and/or storage resources may be located in, or otherwise equipped with, local servers, routers, and/or other network equipment. Such local resources facilitate the satisfying of constraints placed on the system. For example, the local compute and storage resources allow an edge system to perform computations in real-time or near real-time, which may be a consideration in low latency user-cases such as autonomous driving, video surveillance, and mobile media consumption. Additionally, these resources will benefit from service management in an edge system which provides the ability to scale and achieve local service level agreements (SLAs) or service level objectives (SLOs), manage tiered service requirements, and enable local features and functions on a temporary or permanent basis.

A pool can include a device on a same chassis or different physically dispersed devices on different chassis or different racks. A resource pool can include homogeneous processors, heterogeneous processors, and/or a memory pool. Pooling of heterogeneous resources can be implemented using multiple resource pools.

An illustrative edge computing system may support and/or provide various services to endpoint devices (e.g., client user equipment (UEs)), some of which may have different requirements or constraints. For example, some services may have priority or quality-of-service (QoS) constraints (e.g., traffic data for autonomous vehicles may have a higher priority than temperature sensor data), reliability and resiliency (e.g., traffic data may require mission-critical reliability, while temperature data may be allowed some error variance), as well as power, cooling, and form-factor constraints. These and other technical constraints may offer significant complexity and technical challenges when applied in the multi-stakeholder setting.

Figure 10:
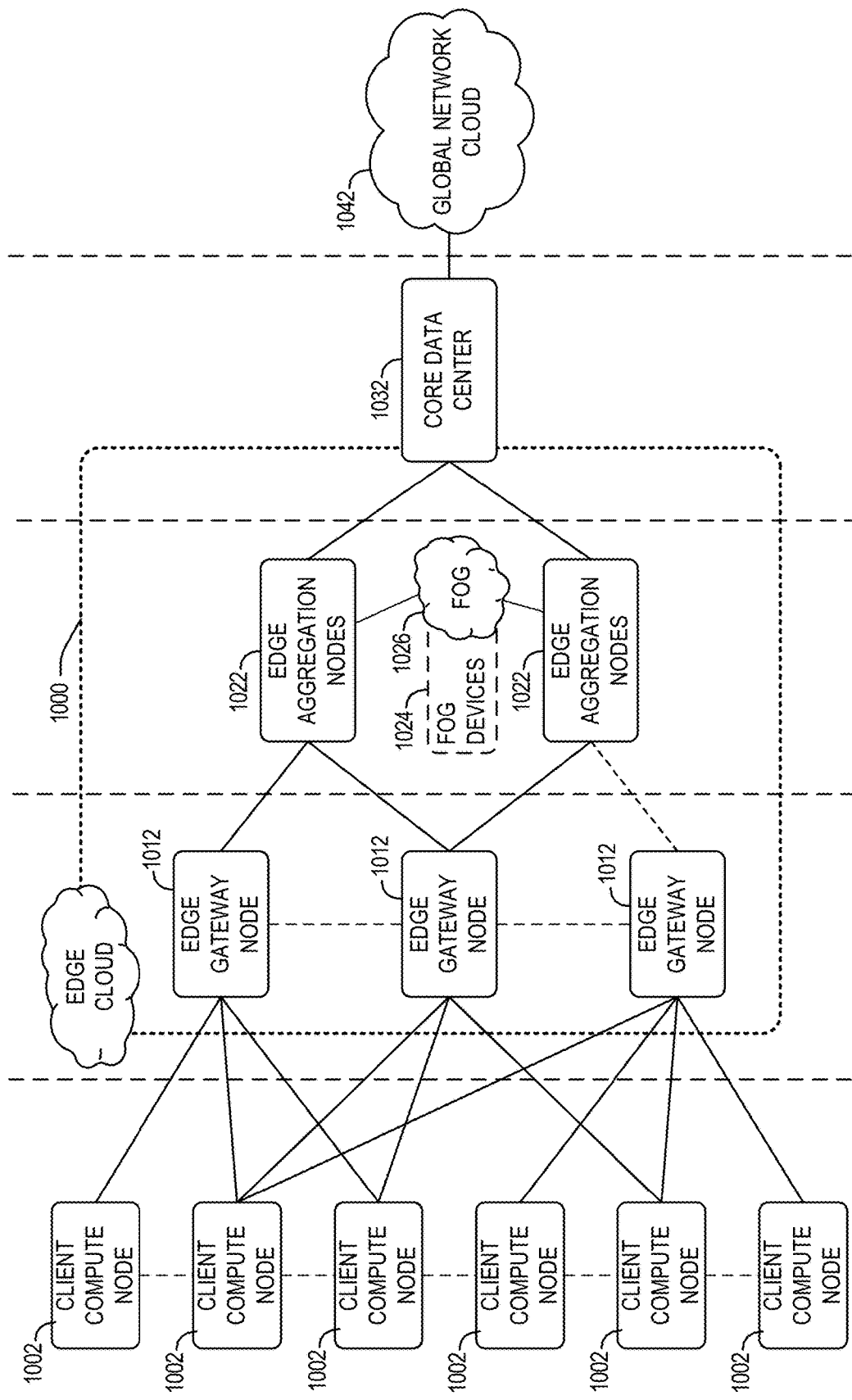
FIG. 10 depicts an example system.

FIG. 10 generically depicts an edge computing system 1000 for providing edge services and applications to multi-stakeholder entities, as distributed among one or more client compute nodes 1002, one or more edge gateway nodes 1012, one or more edge aggregation nodes 1022, one or more core data centers 1032, and a global network cloud 1042, as distributed across layers of the network. One or more microservices can execute on one or more nodes and/or data center. The implementation of the edge computing system 1000 may be provided at or on behalf of a telecommunication service provider ("telco", or "TSP"), internet-of-things service provider, cloud service provider (CSP), enterprise entity, or any other number of entities. Various implementations and configurations of the system 1000 may be provided dynamically, such as when orchestrated to meet service objectives.

For example, the client compute nodes 1002 are located at an endpoint layer, while the edge gateway nodes 1012 are located at an edge devices layer (local level) of the edge computing system 1000. Additionally, the edge aggregation nodes 1022 (and/or fog devices 1024, if arranged or operated with or among a fog networking configuration 1026) are located at a network access layer (an intermediate level). Fog computing (or "fogging") generally refers to extensions of cloud computing to the edge of an enterprise's network or to the ability to manage transactions across the cloud/edge landscape, typically in a coordinated distributed or multi-node network. Some forms of fog computing provide the deployment of compute, storage, and networking services between end devices and cloud computing data centers, on behalf of the cloud computing locations. Some forms of fog computing also provide the ability to manage the workload/workflow level services, in terms of the overall transaction, by pushing certain workloads to the edge or to the cloud based on the ability to fulfill the overall service level agreement. Fog computing in many scenarios provide a decentralized architecture and serves as an extension to cloud computing by collaborating with one or more edge node devices, providing the subsequent amount of localized control, configuration and management, and much more for end devices. Thus, some forms of fog computing provide operations that are consistent with edge computing as discussed herein; the edge computing aspects discussed herein are also applicable to fog networks, fogging, and fog configurations. Further, aspects of the edge computing systems discussed herein may be configured as a fog, or aspects of a fog may be integrated into an edge computing architecture.

The core data center 1032 is located at a core network layer (a regional or geographically-central level), while the global network cloud 1042 is located at a cloud data center layer (a national or world-wide layer). The use of "core" is provided as a term for a centralized network location-deeper in the network-which is accessible by multiple edge nodes or components; however, a "core" does not necessarily designate the "center" or the deepest location of the network. Accordingly, the core data center 1032 may be located within, at, or near the edge cloud 1000. Although an illustrative number of client compute nodes 1002, edge gateway nodes 1012, edge aggregation nodes 1022, edge core data centers 1032, global network clouds 1042 are shown in FIG. 10, it should be appreciated that the edge computing system 1000 may include additional devices or systems at one or more layers. Devices at a layer can be configured as peer nodes to another and, accordingly, act in a collaborative manner to meet service objectives.

Consistent with the examples provided herein, a client compute node 1002 may be embodied as any type of endpoint component, device, appliance, or other thing capable of communicating as a producer or consumer of data. Further, the label "node" or "device" as used in the edge computing system 1000 does not necessarily mean that such node or device operates in a client or agent/minion/follower role; rather, one or more of the nodes or devices in the edge computing system 1000 refer to individual entities, nodes, or subsystems which include discrete or connected hardware or software configurations to facilitate or use the edge cloud 1000.

As such, the edge cloud 1000 is formed from network components and functional features operated by and within the edge gateway nodes 1012 and the edge aggregation nodes 1022. The edge cloud 1000 may be embodied as any type of deployment that provides edge computing and/or storage resources which are proximately located to radio access network (RAN) capable endpoint devices (e.g., mobile computing devices, IoT devices, smart devices, etc.), which are shown in FIG. 10 as the client compute nodes 1002. In other words, the edge cloud 1000 may be envisioned as an "edge" which connects the endpoint devices and traditional network access points that serves as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

In some examples, the edge cloud 1000 may form a portion of or otherwise provide an ingress point into or across a fog networking configuration 1026 (e.g., a network of fog devices 1024, not shown in detail), which may be embodied as a system-level horizontal and distributed architecture that distributes resources and services to perform a specific function. For instance, a coordinated and distributed network of fog devices 1024 may perform computing, storage, control, or networking aspects in the context of an IoT system arrangement. Other networked, aggregated, and distributed functions may exist in the edge cloud 1000 between the core data center 1032 and the client endpoints (e.g., client compute nodes 1002). Some of these are discussed in the following sections in the context of network functions or service virtualization, including the use of virtual edges and virtual services which are orchestrated for multiple stakeholders.

As discussed in more detail below, the edge gateway nodes 1012 and the edge aggregation nodes 1022 cooperate to provide various edge services and security to the client compute nodes 1002. Furthermore, because a client compute node 1002 may be stationary or mobile, a respective edge gateway node 1012 may cooperate with other edge gateway devices to propagate presently provided edge services, relevant service data, and security as the corresponding client compute node 1002 moves about a region. To do so, the edge gateway nodes 1012 and/or edge aggregation nodes 1022 may support multiple tenancy and multiple stakeholder configurations, in which services from (or hosted for) multiple service providers, owners, and multiple consumers may be supported and coordinated across a single or multiple compute devices.

A variety of security approaches may be utilized within the architecture of the edge cloud 1000. In a multi-stakeholder environment, there can be multiple loadable security modules (LSMs) used to provision policies that enforce the stakeholder's interests. Enforcement point environments could support multiple LSMs that apply the combination of loaded LSM policies (e.g., where the most constrained effective policy is applied, such as where if one or more of A, B or C stakeholders restricts access then access is restricted). Within the edge cloud 1000, an edge entity can provision LSMs that enforce the Edge entity interests. The Cloud entity can provision LSMs that enforce the cloud entity interests. Likewise, the various Fog and IoT network entities can provision LSMs that enforce the Fog entity's interests.

Figure 11:
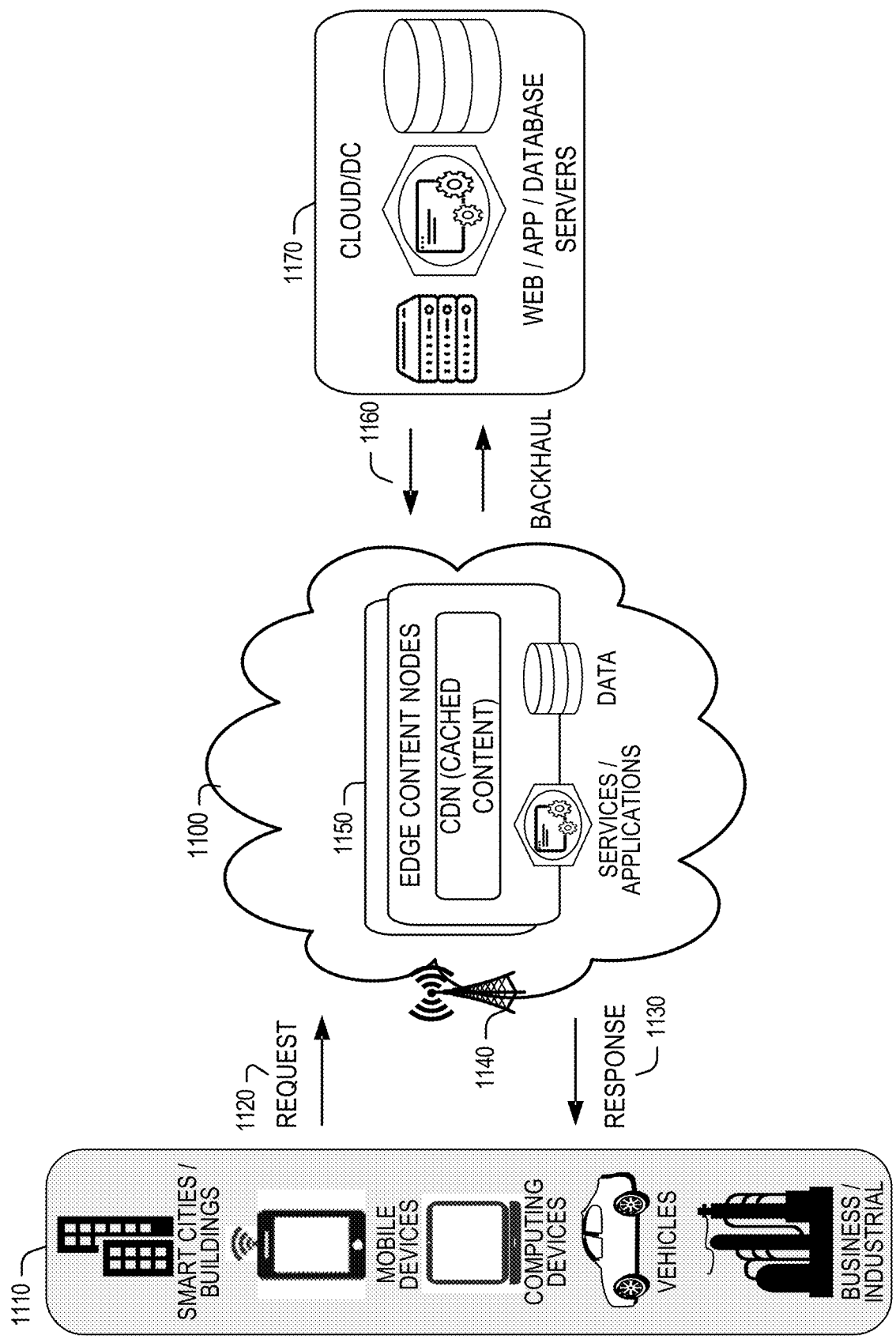
FIG. 11 shows an example system.

FIG. 11 shows an example where various client endpoints 1110 (in the form of mobile devices, computers, autonomous vehicles, business computing equipment, industrial processing equipment) provide requests 1120 for services or data transactions, and receive responses 1130 for the services or data transactions, to and from the edge cloud 1100 (e.g., via a wireless or wired network 1140). One or more microservices can execute on one or more nodes and/or data center. Within the edge cloud 1100, the CSP may deploy various compute and storage resources, such as edge content nodes 1150 to provide cached content from a distributed content delivery network. Other available compute and storage resources available on the edge content nodes 1150 may be used to execute other services and fulfill other workloads. The edge content nodes 1150 and other systems of the edge cloud 1000 are connected to a cloud or data center 1170, which uses a backhaul network 1160 to fulfill higher-latency requests from a cloud/data center for websites, applications, database servers, etc.

Descriptor Format Conversion in a Device

Figure 12:
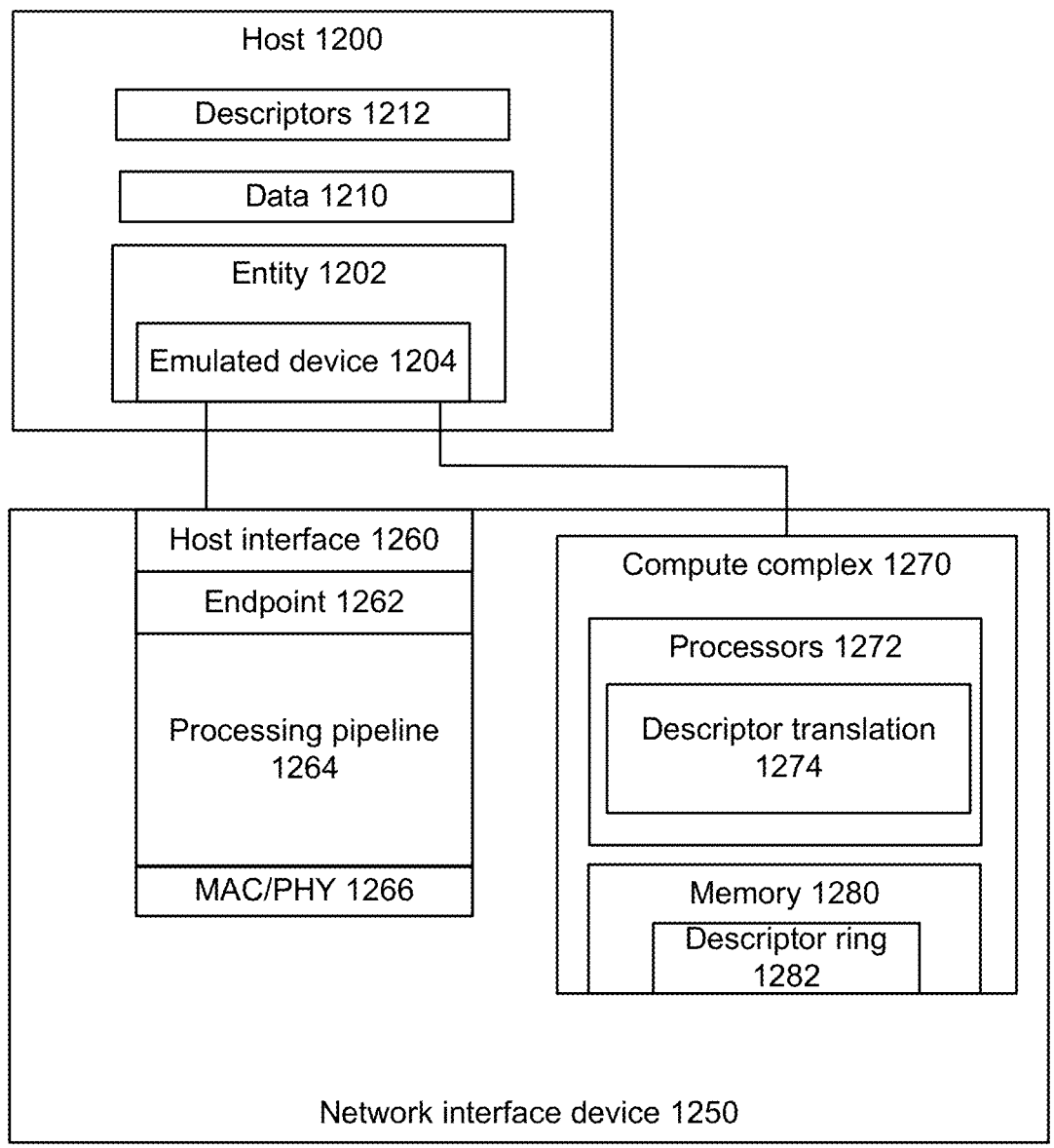
FIG. 12 depicts an example system.

FIG. 12 depicts an example system. In some examples, one or more host server or compute platforms (host 1200) can be communicatively coupled to a device such as network interface device 1250. While examples are described with respect to a network interface device, another device can be used in its place such as a Non-volatile Memory Express (NMVe) consistent storage device, accelerator, graphics processing unit (GPU), or other devices. Examples described herein can also apply in cases where an entire server is rented to a tenant (bare metal usage).

Host 1200 can include hardware resources including one or more processors, one or more memory devices, interconnection circuitry, and a device interface (none shown, but example of such are described herein). Host 1200 can execute a software-based entity 1202 and emulated device interface 1204 using the hardware resources. Data 1210 can be written to or ready by entity 1202 and can include any type of data, including files, objects, video, audio, compressed data, databases, and so forth.

In some examples, entity 1202 can include a virtualized execution environment (virtual environment), serverless application, or microservice(s) executed in a guest environment that shares usage of the hardware resources. In some examples, entity 1202 can execute in a bare metal environment whereby entity 1202 and emulated device interface 1204 can utilize hardware resources. A virtualized execution environment can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an operating system (OS) or application environment that is installed on software, which imitates dedicated hardware. The end user has the same experience on a virtual machine as they would have on dedicated hardware. A hypervisor can emulate a client or server's CPU, memory, hard disk, network and other hardware resources completely, enabling virtual machines to share the resources. The hypervisor can emulate multiple virtual hardware platforms that are isolated from each other, allowing virtual machines to run Linux®, Windows® Server, VMware ESXi, and other operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. The isolated nature of containers provides several benefits. First, the software in a container will run the same in different environments. For example, a container that includes PUP and MySQL can run identically on both a Linux® computer and a Windows® machine. Second, containers provide added security since the software will not affect the host operating system. While an installed application may alter system settings and modify resources, such as the Windows registry, a container can only modify settings within the container.

In some examples, on behalf of entity 1202, emulated device 1204 can access a region of memory as though the region of memory is a device. Examples of emulated device 1204 can include a VMware environment VMXNET3, Non-volatile memory express (NVMe)), Linux environments using virtio devices (e.g., virtio-net, virtio-blk, virtio-scsi), Microsoft® NetVSC, Google virtual NIC (gVNIC), Amazon® Elastic Network Adapter, or others. NVMe is described at least in NVM Express™ Base Specification, Revision 1.3c (2018), as well as predecessors, successors, and proprietary variations thereof.

Emulated device 1204 can permit entity 1202 to access and utilize network interface device 1250. In some examples, entity 1202 can post a work descriptor in a descriptor queue in memory of host 1200. Compute complex 1270 can perform instructions that convert the descriptor to a format that is compatible with a descriptor format utilized by host interface 1260, endpoint 1262, packet processing pipeline 1264, and/or media access control (MAC)/physical layer interface (PHY) 1266. Descriptor translation 1274 performed by processors 1272 of compute complex 1270 can be configured and adjusted to provide compatibility between descriptors accessed by one or more of: emulated device 1204 and host interface 1260, endpoint 1262, packet processing pipeline 1264, and/or MAC/PHY 1266. Translated descriptors can be stored in descriptor ring 1282 in memory 1280. Memory 1280 can be implemented as volatile memory, non-volatile memory, and/or cache.

For example, for a boot, re-boot, or migration of entity 1202 from another host to host 1200, processors 1272 can be configured to perform descriptor translation to provide compatibility between emulated device 1204 and descriptors accessed by one or more of: emulated device 1204 and host interface 1260, endpoint 1262, packet processing pipeline 1264, and/or MAC/PHY 1266. For example, modification of entity 1202 or emulated device 1204 need not occur and a same version of entity 1202 and emulated device 1204, including custom software defined interfaces, can be executed on different platforms with different network interface devices by permitting the network interface device's compute complex to perform descriptor translation.

In some scenarios, the host system is untrusted or is shared with other tenants, and compute complex 1270 can perform the networking, storage and connectivity to accelerators such as GPUs and FPGAs. Various examples can be used to bridge different types of devices, such as running an accelerator device coupled to a network interface device using existing drivers in the VEEs and bare metal hosts.

In some examples, emulated device 1204 can interface with network interface device 1250 using a virtualized interface such as single-root I/O virtualization (SR-IOV), Multi-Root IOV (MR-IOV), or Intel® Scalable I/O Virtualization (SIOV). PCI-SIG Single Root IO Virtualization and Sharing Specification v1.1 and predecessor and successor versions describe use of a single PCIe physical device under a single root port to appear as multiple separate physical devices to a hypervisor or guest operating system. SR-IOV uses physical functions (PFs) and virtual functions (VFs) to manage global functions for the SR-IOV devices. PFs can be PCIe functions that can configure and manage the SR-IOV functionality. For example, a PF can configure or control a PCIe device, and the PF has ability to move data in and out of the PCIe device.

MR-IOV is described at least in Multiple Root I/O Virtualization and Sharing Specification, revision 1.0, May 12, 2008, from the PCI Special Interest Group (SIG), and predecessor and successor versions. A technical specification for SIOV is Intel® Scalable I/O Virtualization Technical Specification, revision 1.0, June 2018, and predecessor and successor versions.

Referring to network interface device 1250, compute complex 1270 can post a translated descriptor (e.g., using Adaptive Virtual Function (AVF)) to one or more of: emulated device 1204 and host interface 1260, endpoint 1262, packet processing pipeline 1264, and/or MAC/PHY 1266. In some examples, a translated descriptor can include an address (e.g., virtual or physical address) of a buffer in host memory from which to read data or to which to write data. In some examples, a translated descriptor (e.g., virtio descriptor) can include a pointer to an address (e.g., virtual or physical address) in host memory that stores an address of a buffer from which to read data or to which to write data and the pointer is used to access a buffer address (e.g., starting address and length). Data can be read from or written to the buffer. For example, packet processing pipeline 1264 can access the translated descriptor and access associated data from a buffer from host memory using a direct memory access (DMA) circuitry of host interface 1260.

Host interface 1260 can include a DMA circuitry to copy data or descriptors from memory in host 1200 to network interface device 1250 or copy data or descriptors from network interface device 1250 to memory in host 1200. Endpoint 1262 and/or packet processing pipeline 1264 can perform various operations including but not limited to Transmission Control Protocol (TCP) offload, Large Receive Offload (LRO), Transport Layer Security (TLS)

offload, checksum, cryptographic operations, encryption, decryption, remote direct memory access (RDMA), reliable transport (RT), compression, traffic shaping, metering, policing, deep packet inspection, transmit rate monitoring, receive rate monitoring, quality of service (QoS) policy application, firewall (e.g., Circuit Proxy Firewall), and other operations. Packet processing pipeline 1264 can be configured to perform match-action operations on packets to identify packet processing rules using information stored in a ternary content-addressable memory (TCAM) tables or exact match tables. For example, match-action tables or circuitry can be used whereby a hash of a portion of a packet is used as an index to find an entry and the entry indicates an operation to perform on the packet. Example implementations of packet processing pipeline 1264 include programmable field programmable gate arrays (FPGAs), fixed function circuitry, or general purpose processors. Configuration of operation of packet processing pipeline 1264 can be programmed using P4, C, Python, Broadcom Network Programming Language (NPL), or x86 compatible executable binaries or other executable binaries.

In some cases, where programmed, packets to be transmitted at the direction of entity 1202 are to be processed by packet processing pipeline 1264 and/or processors 1272 prior to transmission to a destination. In some cases, where programmed, packet processing pipeline 1264 can process received packets and/or direct received packets to be processed by processors 1272 prior to copying to host 1200.

MAC/PHY 1266 can include encoding and decoding circuitry to encode and decode data packets according to applicable physical layer specifications or standards (e.g., Ethernet). MAC circuitry can be configured to perform MAC address filtering on received packets, process MAC headers of received packets by verifying data integrity, remove preambles and padding, and provide packet content for processing by higher layers. MAC circuitry can be configured to assemble data to be transmitted into packets, that include destination and source addresses along with network control information and error detection hash values.

Figure 13:
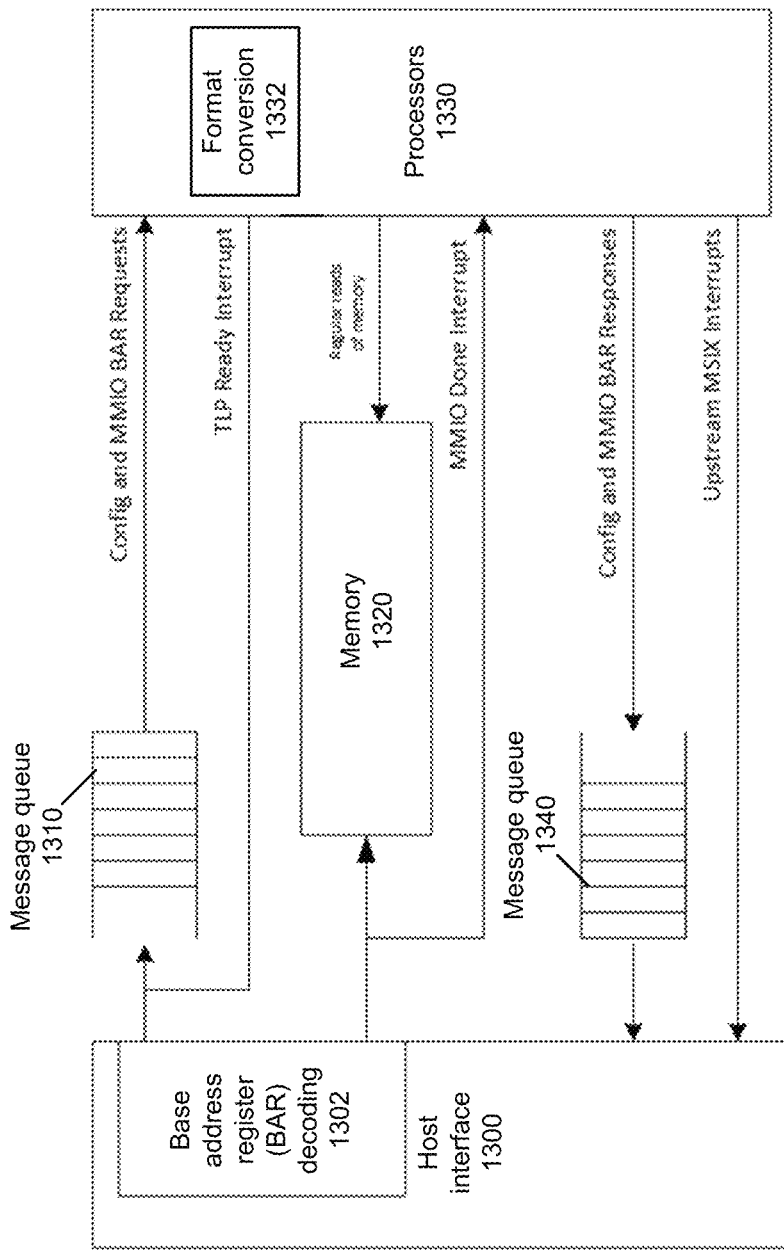
FIG. 13 depicts an example system in which a compute complex can communicate with one or more emulated devices.

FIG. 13 depicts an example system in which a compute complex can communicate with one or more emulated devices. Processors 1330 can manipulate device interface transactions (e.g., PCIe Transaction layer packet (TLP)) to provide a bridge between the hardware device (e.g., network interface device) and the emulated device. Processors 1330 can detect when data is ready to be sent or written (e.g., packet transmit request or new storage request) in a descriptor provided in message queue 1310 via one or more TLPs and can construct a corresponding descriptor and place the descriptor into message queue 1340 of memory 1320 for the hardware device associated with this emulated device. The descriptor can point to data locations in the compute complex (e.g., memory 1320) and/or to host memory. Format conversion software 1332 executing on processors 1330 can fetch a descriptor and convert a descriptor format and store the translated descriptor into memory of the hardware device (e.g., network interface device memory). Software executing on processors 1330 can cause the hardware device to fetch the translated descriptor. Host interface 1300 can transfer translated descriptors from message queue 1340 to the hardware device or host using one or more TLPs.

In some examples, VMXNET3 interface defines data areas, shared between the device and the driver.

| Shared data | Example description |
| --- | --- |
| Emulation-only registers | Located in the device memory and shared with the driver (BAR0). Can specify the device type and version and allows to exchange commands. |
| Pass-through registers | Can be used to control interrupts and as doorbells. Can be located in the device memory and shared with the driver (BAR1) |
| Non-passthrough registers | Can be located in the device memory/registers and not directly shared with the driver. Can be used for internal bookkeeping and live migration. |
| Receive (RX) and transmit (TX) rings | Can be located in the driver memory and accessed from the driver using DMA. |

A hypervisor can provide device PCIe composition to the virtual execution environments or microservices. The hypervisor can compose a VMXnet3 PCI-E configuration space with passthrough data queues as provided by host acceleration VFs and emulated memory mapped input output (MMIO) space for sideband configuration. The hypervisor can receive the sideband configuration information such as Queue Context (e.g., Base Address, length, etc.) from a VMXNET3 driver. The hypervisor can pass this information to the host acceleration PF. Hypervisor can also pass runtime change to a configuration to a host acceleration PF Driver.

Figure 14A:
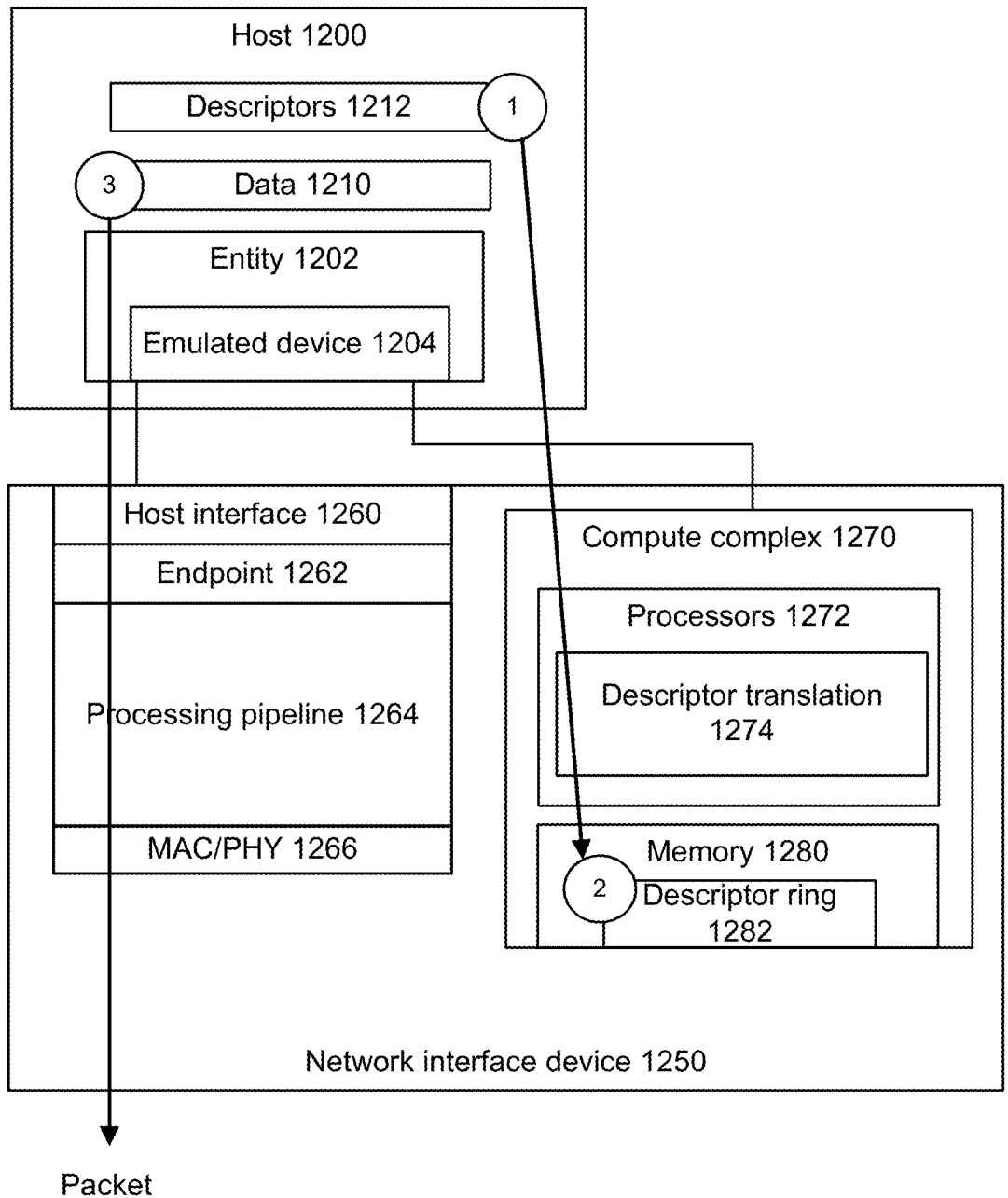
FIG. 14A depicts an example of packet transmission.

FIG. 14A depicts an example of a packet transmission operation. In this example, an emulated device is VMXNET3 driver, although other emulated devices can be used. At (1), entity 1202 uses emulated device 1204 (e.g., VMXNET3 driver) to inform compute complex 1270 of a new packet transmit descriptor on descriptor ring 1212. At (2), compute complex 1270 can read the new packet transmit descriptor from descriptor ring 1212 and payload header using a DMA circuitry. At (2), processors 1272 can perform descriptor translation 1274 to perform translation of the transmit descriptor to be properly interpreted by endpoint 1262. At (3), endpoint 1262 can utilize DMA circuitry to copy payload data 1210 to memory of a network interface device 1250 (not shown) based on the translated descriptor.

Figure 14B:
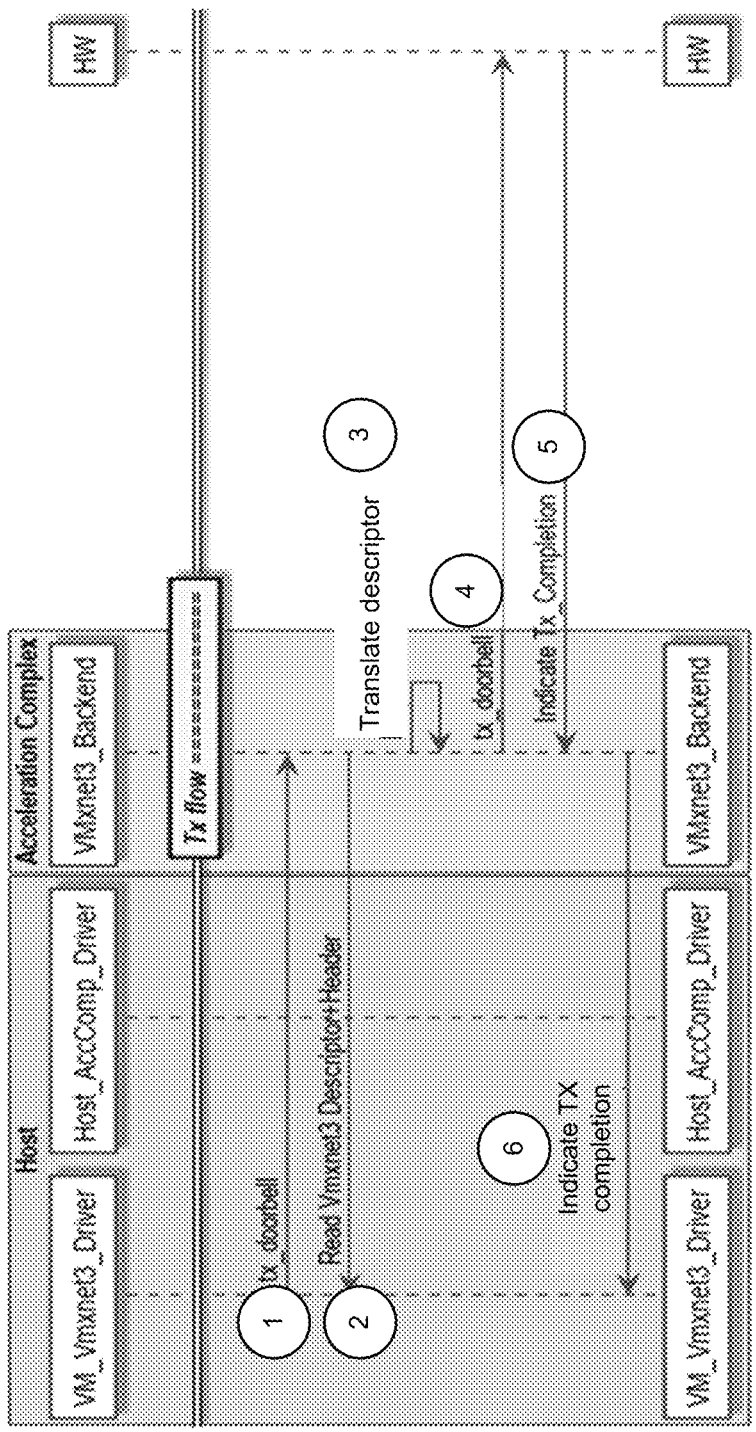
FIG. 14B depicts an example packet transmission flow.

FIG. 14B depicts an example packet transmission flow. In this example, an emulated device is VMXNET3 driver, although other emulated devices can be used. At (1), a processor of an acceleration complex (e.g., compute complex) in a network interface device can execute software (VMxnet3 Backend) that receives a doorbell from a VMXNET3 descriptor ring using at least one TLP Queue transaction. At (2), the VMxnet3 Backend reads out VMXNET3 descriptor (and optionally, an associated payload header) using DMA circuitry. At (3), the VMxnet3 Backend performs descriptor translation and populates queues (e.g., PF queues) with a translated descriptor. At (4), the VMxnet3 Backend informs the hardware of a translated descriptor that directly identifies a memory address of a payload or indirectly identifies a memory address of a payload by a pointer to a memory address of the payload. At (5), after completion of packet processing and packet transmission, the network interface device (hardware (HW)) indicates transmission completion to the VMxnet3 Backend. At (6), the VMxnet3 Backend informs the VMXNET3 driver of completion of packet transmission.

Figure 15A:
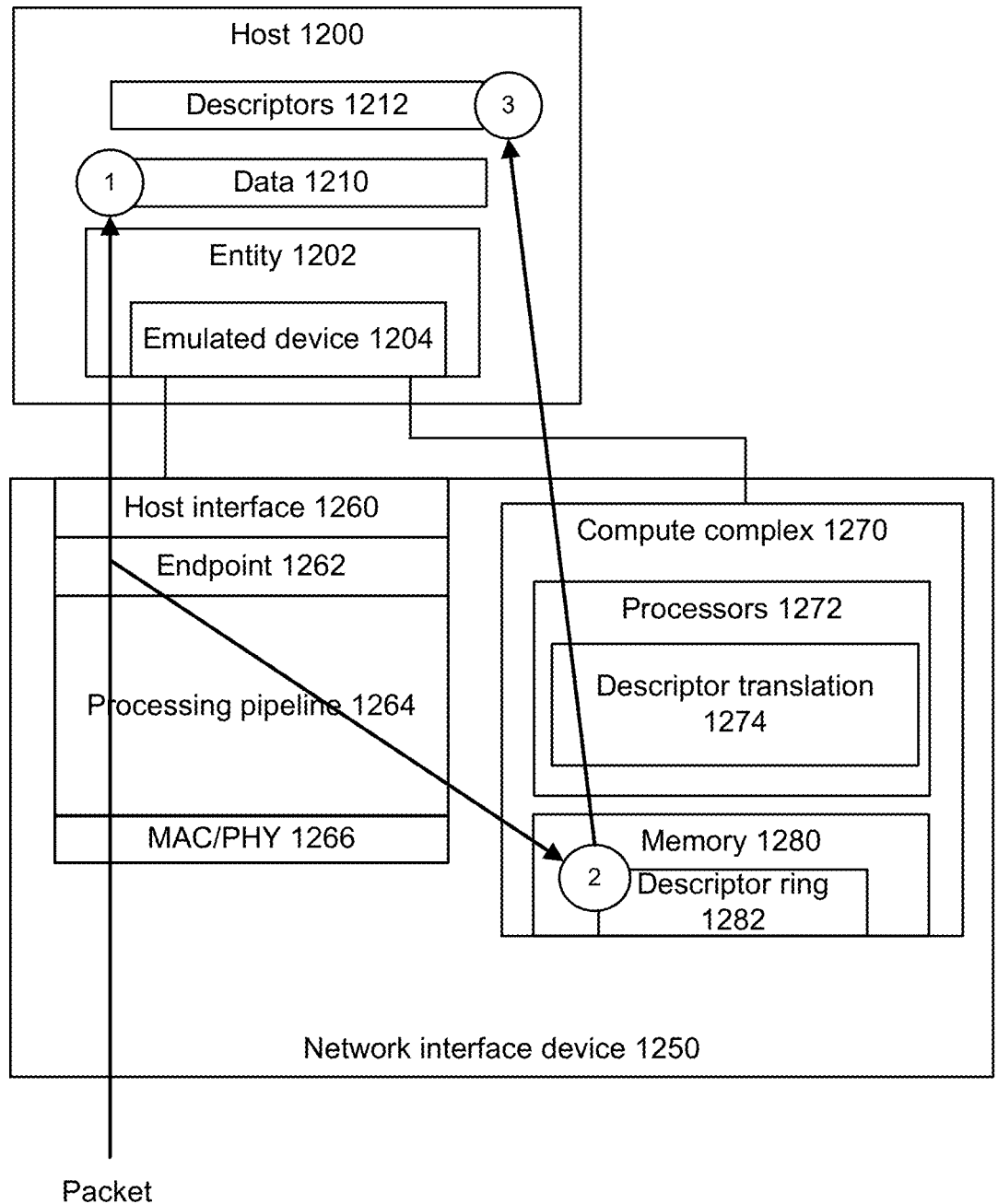
FIG. 15A depicts an example of packet receipt.

FIG. 15A depicts an example of packet receipt. In this example, an emulated device is VMXNET3 driver, although other emulated devices can be used. In this example, a queue for an emulated device 1204 (e.g., VMXNET3) is setup with descriptors and buffers in a VM memory space. In response to receipt of a packet, a packet payload is posted, at (1) to the VM buffer (e.g., data 1210) and its header is provided to VM buffer or to compute complex 1270 for processing. At (2), the descriptor from the endpoint 1262 is translated by descriptor translation 1274 into a format of emulated device 1204 (e.g., VMXNET3). At (3), the translated receive descriptor is copied to descriptor ring 1212.

Figure 15B:
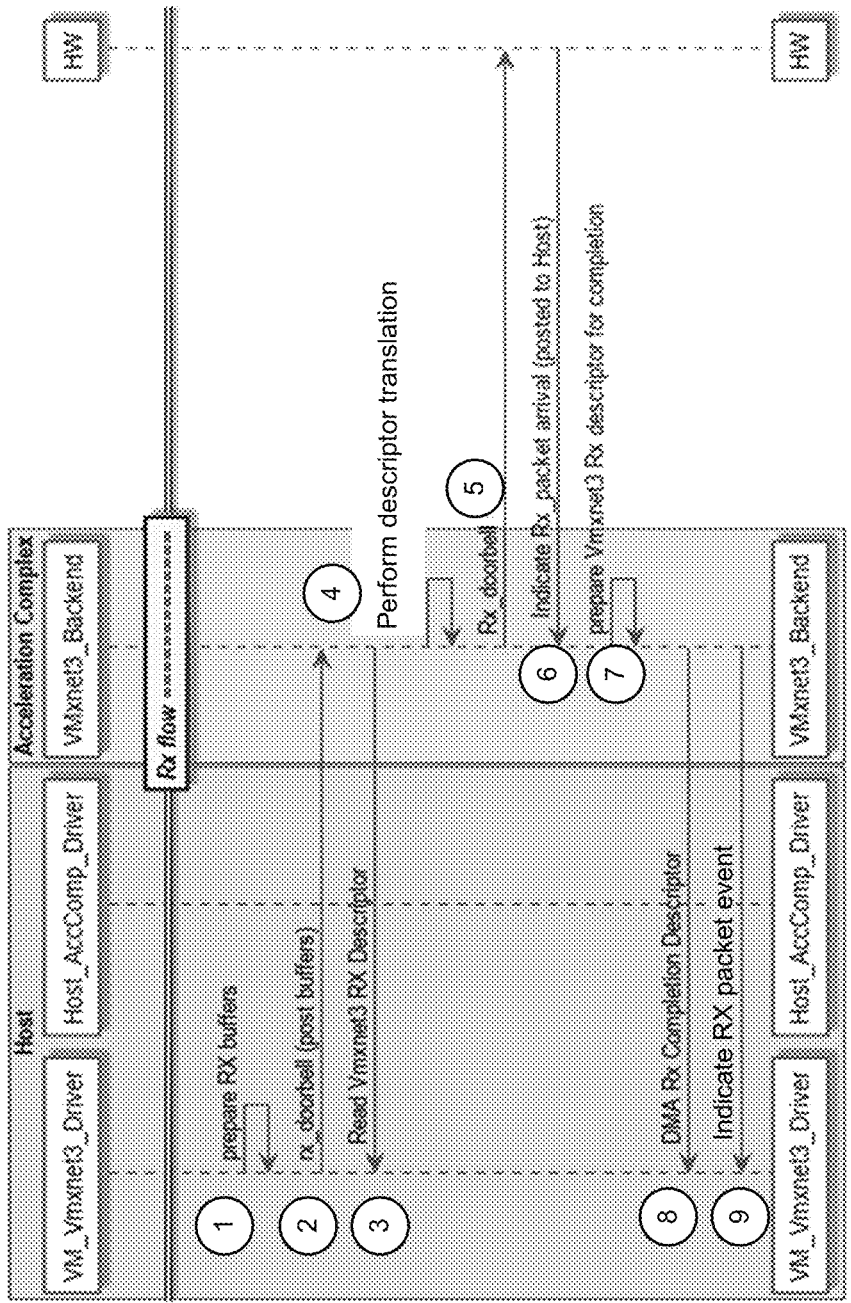
FIG. 15B depicts an example packet receipt flow.

FIG. 15B depicts an example packet receipt flow. In this example, an emulated device is VMXNET3 driver, although other emulated devices can be used. At (1), VMXNET3 Rx queue is setup with descriptors and buffers in VM memory space. At (2), VMXNET3 Backend executed on acceleration complex (e.g., compute complex) processors receives the RX side Doorbell from VMXNET3 driver over TLP queues. At (3), VMXNET3 Backend reads the VMXNET3 RX buffer descriptors from the VM using a DMA Engine. At (4), VMXNET3 Backend translates the RX descriptor to a format of the circuitry in the network interface device (HW) that will interpret the descriptor and posts receive buffers to the hardware device endpoint using network interface device compatible descriptors. At (5), a receive doorbell is provided to the network interface device to indicate availability of a translated descriptor. At (6), packet receipt is indicated by the network interface device to the acceleration complex. At (7), an Rx completion descriptor for the received packet is posted to VMXNET3 Backend and the VMXNET3 Backend translates the Rx completion descriptor to VMXNET3 receive (RX) completion descriptor format and provides the translated descriptor at (8). The packet payload is copied to a VM buffer identified in the translated Rx completion descriptor. At (9), VMXNET3 Backend indicates packet arrival to VMXNET3 device driver.

Figure 16:
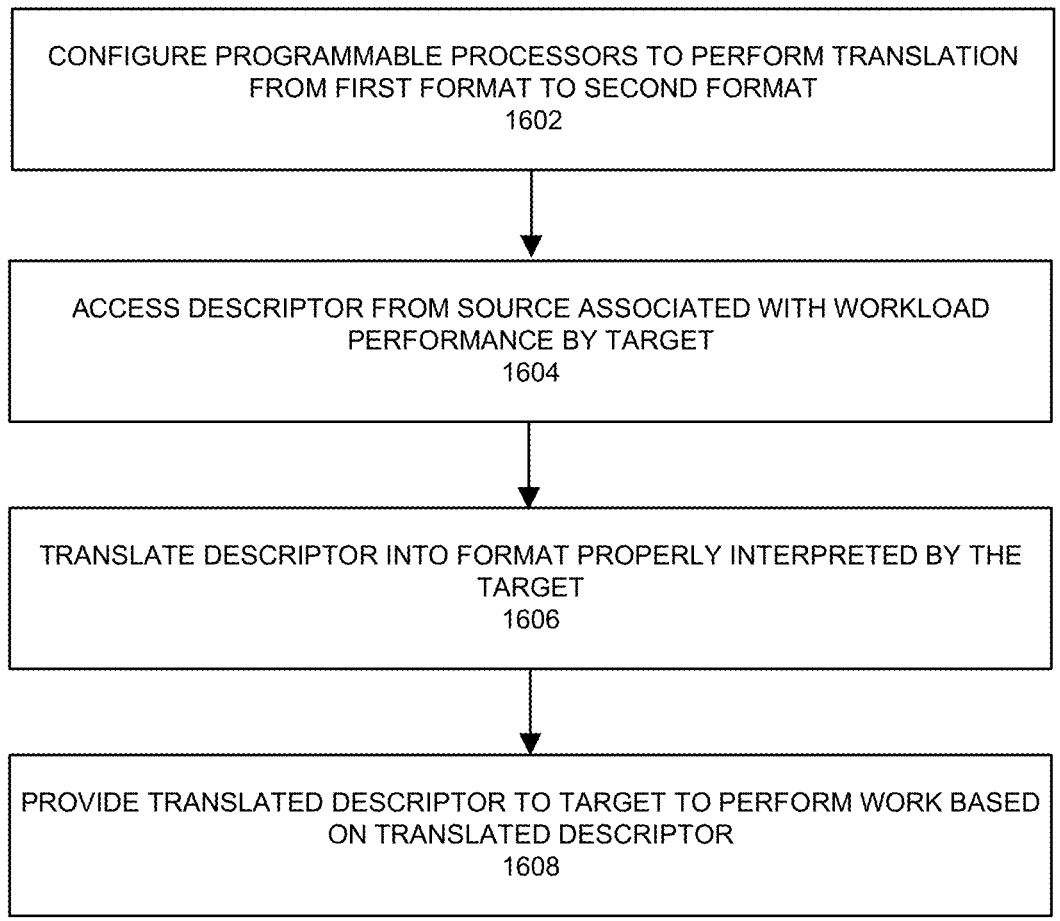
FIG. 16 depicts an example process.

FIG. 16 depicts an example process. The process can be performed by a network interface device or other device with programmable processors. At 1602, the programmable processors can be configured to perform translation of a descriptor or other work request between different formats. For example, in the case of a transmit descriptor or data write descriptor, the programmable processors can be configured to translate a descriptor from an emulated device format to a format accepted and properly interpreted by the hardware device. For example, in the case of a receive descriptor or data read descriptor, the programmable processors can be configured to translate a descriptor from a format accepted and properly interpreted by the hardware device to a format accepted and properly interpreted by the emulated device. For example, descriptor fields can be translated using look-up-tables to convert a value in a field of a descriptor to a same or different value in a translated descriptor. The look-up-table can be used to indicate which fields to copy or translate from a descriptor into specific fields of a translated descriptor. A match-action unit can be used to perform descriptor translation in some examples. A properly interpreted descriptor can be a descriptor having fields positions, field sizes, and values that are among field positions, field sizes, and values configured to be interpreted by the receiver of the descriptor. In other words, the receiver of the descriptor can read values of fields at correct boundaries and is configured to perform an action based on a particular value in a field.

At 1604, a descriptor can be accessed from a source. For example, in the case of a transmit descriptor or data write descriptor, the source can be a descriptor ring associated with an emulated device. For example, in the case of a receive descriptor or data read descriptor, the source can be a descriptor ring of a compute complex. Examples of emulated devices include VMXNET3, Non-volatile memory express (NVMe)), Linux environments using virtio devices (e.g., virtio-net, virtio-blk, virtio-scsi), Microsoft® NetVSC, Google virtual NIC (gVNIC), Amazon® Elastic Network Adapter, or others. Examples of hardware devices include network interface devices, storage controllers, accelerators, GPUs, and so forth.

At 1606, a descriptor format can be translated to a second format of the target. For example, in the case of a transmit descriptor or data write descriptor, the target can be a hardware device's packet processing pipeline or DMA circuitry. For example, in the case of a receive descriptor or data read descriptor, the target can be an emulated device.

At 1608, the translated descriptor can be provided to the target. The target can access data from a storage or memory address referenced by the translated descriptor and perform an action associated with the translated descriptor. For example, for a packet transmit descriptor, a network interface device can transmit a packet payload associated with the translated descriptor. For example, for a packet receive descriptor, an emulated device can perform protocol processing of a packet associated with the translated descriptor. For a data write descriptor, a storage controller can write data to a storage medium. For a data read descriptor, a storage controller can read data from a storage medium.

Figure 17:
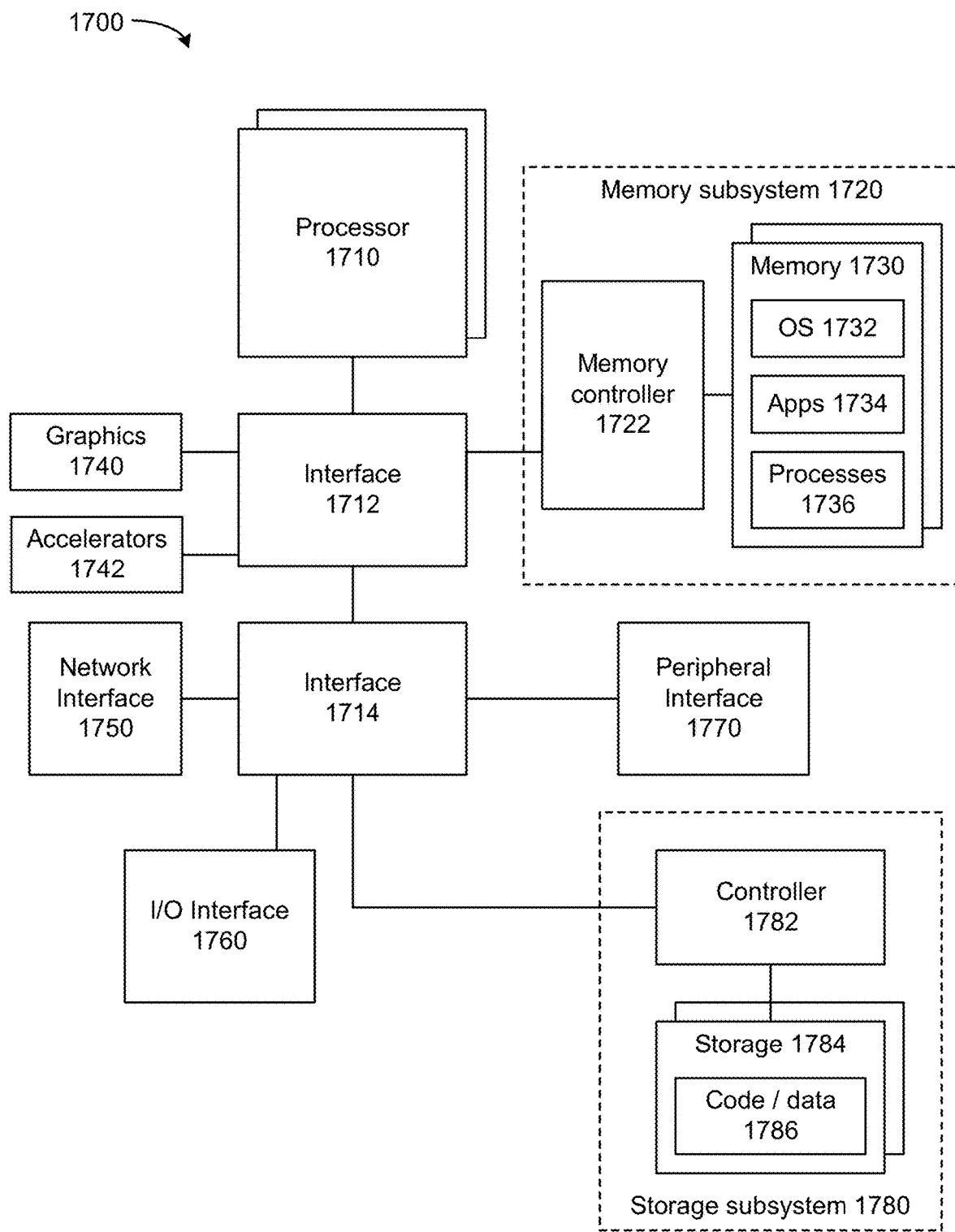
FIG. 17 depicts an example computing system.

FIG. 17 depicts an example computing system. Various examples can use components of system 1700 (e.g., processor 1710, network interface 1750, and so forth) to execute an emulated device, and perform descriptor translation for a descriptor from the emulated device to a hardware device or translation of a descriptor from the hardware device to an emulated device, as described herein.

System 1700 includes processor 1710, which provides processing, operation management, and execution of instructions for system 1700. Processor 1710 can include any type of microprocessor, central processing unit (CPU), graphics processing unit (GPU), processing core, or other processing hardware to provide processing for system 1700, or a combination of processors. Processor 1710 controls the overall operation of system 1700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1700 includes interface 1712 coupled to processor 1710, which can represent a higher speed interface or a high throughput interface for system components that needs higher bandwidth connections, such as memory subsystem 1720 or graphics interface components 1740, or accelerators 1742. Interface 1712 represents an interface circuit, which can be a standalone component or integrated onto a processor die. Where present, graphics interface 1740 interfaces to graphics components for providing a visual display to a user of system 1700. In one example, graphics interface 1740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1740 generates a display based on data stored in memory 1730 or based on operations executed by processor 1710 or both.

Accelerators 1742 can be a fixed function or programmable offload engine that can be accessed or used by a processor 1710. For example, an accelerator among accelerators 1742 can provide compression (DC) capability, cryptography services such as public key encryption (PKE), cipher, hash/authentication capabilities, decryption, or other capabilities or services. In some cases, accelerators 1742 can be integrated into a CPU socket (e.g., a connector to a motherboard or circuit board that includes a CPU and provides an electrical interface with the CPU). For example, accelerators 1742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 1742 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1720 represents the main memory of system 1700 and provides storage for code to be executed by processor 1710, or data values to be used in executing a routine. Memory subsystem 1720 can include one or more memory devices 1730 such as read-only memory (ROM), flash memory, one or more varieties of random access memory (RAM) such as DRAM, or other memory devices, or a combination of such devices. Memory 1730 stores and hosts, among other things, operating system (OS) 1732 to provide a software platform for execution of instructions in system 1700. Additionally, applications 1734 can execute on the software platform of OS 1732 from memory 1730. Applications 1734 represent programs that have their own operational logic to perform execution of one or more functions. Processes 1736 represent agents or routines that provide auxiliary functions to OS 1732 or one or more applications 1734 or a combination. OS 1732, applications 1734, and processes 1736 provide software logic to provide functions for system 1700. In one example, memory subsystem 1720 includes memory controller 1722, which is a memory controller to generate and issue commands to memory 1730. It will be understood that memory controller 1722 could be a physical part of processor 1710 or a physical part of interface 1712. For example, memory controller 1722 can be an integrated memory controller, integrated onto a circuit with processor 1710.

In some examples, OS 1732 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others. OS 1732 can be part of a virtualized execution environment and interact with an emulated device to communicate workloads or descriptors to another device (e.g., graphics 1740, accelerators 1742, memory subsystem 1720, or controller 1782).

While not specifically illustrated, it will be understood that system 1700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1700 includes interface 1714, which can be coupled to interface 1712. In one example, interface 1714 represents an interface circuit, which can include standalone components and integrated circuitry. In one example, multiple user interface components or peripheral components, or both, couple to interface 1714. Network interface 1750 provides system 1700 the ability to communicate with remote devices (e.g., servers or other computing devices) over one or more networks. Network interface 1750 can include an Ethernet adapter, wireless interconnection components, cellular network interconnection components, USB (universal serial bus), or other wired or wireless standards-based or proprietary interfaces. Network interface 1750 can transmit data to a device that is in the same data center or rack or a remote device, which can include sending data stored in memory. Network interface 1750 can receive data from a remote device, which can include storing received data into memory. Various examples of network interface 1750 can include processors to perform descriptor translation for a descriptor from the emulated device to a hardware device or translation of a descriptor from the hardware device to an emulated device, as described herein.

In one example, system 1700 includes one or more input/output (I/O) interface(s) 1760. I/O interface 1760 can include one or more interface components through which a user interacts with system 1700 (e.g., audio, alphanumeric, tactile/touch, or other interfacing). Peripheral interface 1770 can include any hardware interface not specifically mentioned above. Peripherals refer generally to devices that connect dependently to system 1700. A dependent connection is one where system 1700 provides the software platform or hardware platform or both on which operation executes, and with which a user interacts.

In one example, system 1700 includes storage subsystem 1780 to store data in a nonvolatile manner. In one example, in certain system implementations, at least certain components of storage 1780 can overlap with components of memory subsystem 1720. Storage subsystem 1780 includes storage device(s) 1784, which can be or include any conventional medium for storing large amounts of data in a nonvolatile manner, such as one or more magnetic, solid state, or optical based disks, or a combination. Storage 1784 holds code or instructions and data 1786 in a persistent state (e.g., the value is retained despite interruption of power to system 1700). Storage 1784 can be generically considered to be a "memory," although memory 1730 is typically the executing or operating memory to provide instructions to processor 1710. Whereas storage 1784 is nonvolatile, memory 1730 can include volatile memory (e.g., the value or state of the data is indeterminate if power is interrupted to system 1700). In one example, storage subsystem 1780 includes controller 1782 to interface with storage 1784. In one example controller 1782 is a physical part of interface 1714 or processor 1710 or can include circuits or logic in both processor 1710 and interface 1714.

A volatile memory is memory whose state (and therefore the data stored in it) is indeterminate if power is interrupted to the device. Dynamic volatile memory refreshes the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as DDR3 (Double Data Rate version 3, original release by JEDEC (Joint Electronic Device Engineering Council) on Jun. 16, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one example, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 1700. More specifically, power source typically interfaces to one or multiple power supplies in system 1700 to provide power to the components of system 1700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1700 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be written to or read from virtualized storage nodes or memory pools using a protocol such as NVMe over Fabrics (NVMe-oF) or NVMe.

Examples herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade can include components common to conventional servers, including a main printed circuit board (main board) providing internal wiring (e.g., buses) for coupling appropriate integrated circuits (ICs) and other components mounted to the board.

In some examples, network interface and other examples described herein can be used in connection with a base station (e.g., 3G, 4G, 5G and so forth), macro base station (e.g., 5G networks), picostation (e.g., an IEEE 802.11 compatible access point), nanostation (e.g., for Point-to-Multi-Point (PtMP) applications), on-premises data centers, off-premises data centers, edge network elements, edge servers, edge switches, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in examples.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative examples. Furthermore, additional operations may be added or removed depending on the particular applications. Any combination of changes can be used and one of ordinary skill in the art with the benefit of this disclosure would understand the many variations, modifications, and alternative examples thereof.

Disjunctive language such as the phrase "at least one of X, Y, or Z," unless specifically stated otherwise, is otherwise understood within the context as used in general to present that an item, term, etc., may be either X, Y, or Z, or combination thereof (e.g., X, Y, and/or Z). Thus, such disjunctive language is not generally intended to, and should not, imply that certain examples require at least one of X, at least one of Y, or at least one of Z to each be present. Additionally, conjunctive language such as the phrase "at least one of X, Y, and Z," unless specifically stated otherwise, should also be understood to mean X, Y, Z, or combination thereof, including "X, Y, and/or Z."

Illustrative examples of the devices, systems, and methods disclosed herein are provided below. An example of the devices, systems, and methods may include one or more, and combination of, the examples described below.

Example 1 includes one or more examples and includes an apparatus comprising: a network interface device comprising: a device interface; at least one processor; a direct memory access (DMA) device; and a packet processing circuitry, wherein: the at least one processor, when operational, is configured to: in connection with a first operation: perform a format translation of a first descriptor from a first format associated with an emulated device to a second format associated with the packet processing circuitry and provide, to the packet processing circuitry, the translated first descriptor.

Example 2 includes one or more examples, wherein the emulated device comprises software associated with a virtualized execution environment that is presented as a hardware device to the virtualized execution environment.

Example 3 includes one or more examples, wherein the emulated device is associated with a virtualized execution environment migrated from a first compute platform to a second platform and wherein the second platform is communicatively coupled to the network interface device using the device interface.

Example 4 includes one or more examples, wherein the emulated device comprises one or more of: VMware VMXNET, Linux VirtIO, non-volatile memory express (NVMe), Microsoft® NetVSC, Google virtual NIC (gVNIC), or Amazon® Elastic Network Adapter.

Example 5 includes one or more examples, wherein the DMA device is to copy data from the host memory to the network interface device based on a memory address referenced by the translated first descriptor.

Example 6 includes one or more examples, wherein the packet processing circuitry comprises one or more of: a packet processing pipeline that includes at least one configurable match-action unit (MAU) or a storage controller.

Example 7 includes one or more examples, wherein the at least one processor, when operational, is configured to: in connection with a second operation: perform a format translation of a second descriptor from the second format associated with the packet processing circuitry to the first format associated with the emulated device and provide, to the emulated device, the translated second descriptor.

Example 8 includes one or more examples, wherein the first operation comprises a packet transmit operation or a data write operation and the second operation comprises a packet receive operation or a data read operation.

Example 9 includes one or more examples, comprising a host server to execute a virtualized execution environment associated with the emulated device and the host server is communicatively coupled to the network interface device using the device interface.

Example 10 includes one or more examples, comprising a data center, wherein the data center includes a source server and the host server and wherein the emulated device is associated with a virtualized execution environment migrated from the source server to the host server.

Example 11 includes one or more examples, and includes a non-transitory computer-readable medium comprising instructions stored thereon, that if executed by one or more processors of a network interface device, cause the one or more processors of the network interface device to: in connection with a first operation: perform a format translation of a first descriptor from a first format associated with an emulated device to a second format associated with packet processing circuitry and provide, to the packet processing circuitry, the translated first descriptor.

Example 12 includes one or more examples, wherein the emulated device comprises software associated with a virtualized execution environment that is presented as a hardware device to the virtualized execution environment.

Example 13 includes one or more examples, wherein the emulated device is associated with a virtualized execution environment migrated from a first compute platform to a second platform and wherein the second platform is communicatively coupled to the network interface device using a device interface.

Example 14 includes one or more examples, wherein the packet processing circuitry comprises one or more of: a packet processing pipeline that includes at least one configurable match-action unit (MAU) or a storage controller.

Example 15 includes one or more examples, comprising instructions stored thereon, that if executed by one or more processors of the network interface device, cause the one or more processors of the network interface device to in connection with a second operation: perform a format translation of a second descriptor from the second format associated with the packet processing circuitry to the first format associated with the emulated device and provide, to the emulated device, the translated second descriptor.

Example 16 includes one or more examples, wherein the first operation comprises a packet transmit operation or a data write operation and the second operation comprises a packet receive operation or a data read operation.

Example 17 includes one or more examples, and includes method comprising: at a network interface device: in connection with a first operation: performing a translation of a first descriptor from a first format associated with an emulated software device to a second format associated with a packet processing circuitry of the network interface device and providing the translated first descriptor to the packet processing circuitry.

Example 18 includes one or more examples, wherein the emulated software device comprises software associated with a virtualized execution environment that is presented as a hardware device to the virtualized execution environment.

Example 19 includes one or more examples, comprising: at the network interface device: in connection with a second operation: perform a descriptor format translation of a second descriptor from the second format associated with the packet processing circuitry to the first format associated with the emulated software device and provide, to the emulated device, the translated second descriptor.

Example 20 includes one or more examples, wherein the first operation comprises a packet transmit operation or a data write operation and the second operation comprises a packet receive operation or a data read operation.

The invention claimed is:

1. An apparatus comprising:
   a network interface device comprising:
      a device interface;
      at least one processor;
      a direct memory access (DMA) device; and
      a packet processing circuitry, wherein:
         the at least one processor, when operational, is configured to:
            in connection with a first operation associated with execution of a virtualized execution environment and an emulated device after migration of the virtualized execution environment and the emulated device to execute on a target system: perform a format translation of a first descriptor from a first format associated with the emulated device to a second format associated with the packet processing circuitry; and
            provide, to the packet processing circuitry, the translated first descriptor, wherein the network interface device is accessible to the virtualized execution environment as a virtual device in a manner consistent with single-root I/O virtualization (SR-IOV).

2. The apparatus of claim 1, wherein the emulated device comprises software associated with a virtualized execution environment that is presented as a hardware device to the virtualized execution environment.

3. The apparatus of claim 1, wherein
   the emulated device is associated with the virtualized execution environment migrated from a first compute system to the target system,
   the second platform target system is communicatively coupled to the network interface device using the device interface.

4. The apparatus of claim 1, wherein the emulated device is consistent with one or more of: VMware VMXNET, Linux VirtIO, non-volatile memory express (NVMe), Microsoft® NetVSC, Google virtual NIC (gVNIC), or Amazon® Elastic Network Adapter.

5. The apparatus of claim 1, wherein the DMA device is to copy data from host memory to the network interface device based on a memory address referenced by the translated first descriptor and wherein the network interface device is to transmit the data in at least one packet.

6. The apparatus of claim 1, wherein the packet processing circuitry comprises one or more of: a packet processing pipeline that includes at least one configurable match-action unit (MAU) or a storage controller.

7. The apparatus of claim 1, wherein the at least one processor, when operational, is configured to:
in connection with a second operation:
perform a format translation of a second descriptor from the second format associated with the packet processing circuitry to the first format associated with the emulated device and
provide, to the emulated device, the translated second descriptor.

8. The apparatus of claim 7, wherein the first operation comprises a packet transmit operation or a data write operation and the second operation comprises a packet receive operation or a data read operation.

9. The apparatus of claim 1, comprising the target system and the target system is communicatively coupled to the network interface device using the device interface.

10. The apparatus of claim 9, comprising a data center, wherein the data center includes a source server and the target system.

11. The apparatus of claim 1, wherein:
the migration of the virtualized execution environment and the emulated device comprises migration of the virtualized execution environment and the emulated device from a source system coupled to a first network interface device to the target system coupled to the network interface device,
the first network interface device is accessible as an SR-IOV device, and
the first network interface device and the network interface device are associated with different vendors.

12. At least one non-transitory computer-readable medium comprising instructions stored thereon, that if executed by one or more processors of a first network interface device, cause the one or more processors of the first network interface device to:
in connection with a first operation associated with execution of a virtualized execution environment and an emulated device after migration of the virtualized execution environment and the emulated device to execute on a target system:
the one or more processors of the first network interface device to:
perform a format translation of a first descriptor from a first format associated with the emulated device to a second format associated with packet processing circuitry of the first network interface device and
provide, to the packet processing circuitry, the translated first descriptor, wherein the first network interface device is accessible to the virtualized execution environment as a virtual device in a manner consistent with single-root I/O virtualization (SR-IOV).

13. The non-transitory computer-readable medium of claim 12, wherein the emulated device comprises software associated with the virtualized execution environment that is presented as a hardware device to the virtualized execution environment.

14. The non-transitory computer-readable medium of claim 12, wherein the packet processing circuitry comprises one or more of: a packet processing pipeline that includes at least one configurable match-action unit (MAU) or a storage controller.

15. The non-transitory computer-readable medium of claim 12, comprising instructions stored thereon, that if executed by one or more processors of the first network interface device, cause the one or more processors of the first network interface device to
in connection with a second operation:
perform a format translation of a second descriptor from the second format associated with the packet processing circuitry to the first format associated with the emulated device and
provide, to the emulated device, the translated second descriptor.

16. The non-transitory computer-readable medium of claim 15, wherein the first operation comprises a packet transmit operation or a data write operation and the second operation comprises a packet receive operation or a data read operation.

17. A method comprising:
at a network interface device:
in connection with a first operation associated with execution of a virtualized execution environment and an emulated device after migration of the virtualized execution environment and the emulated device to execute on a target system:
performing a translation of a first descriptor from a first format associated with the emulated device to a second format associated with a packet processing circuitry of the network interface device and
providing the translated first descriptor to the packet processing circuitry to perform an operation specified by the translated first descriptor, wherein the network interface device is accessible to the virtualized execution environment as a virtual device in a manner consistent with single-root I/O virtualization (SR-IOV).

18. The method of claim 17, wherein the emulated software device comprises software associated with the virtualized execution environment that is presented as a hardware device to the virtualized execution environment.

19. The method of claim 17, comprising:
at the network interface device:
in connection with a second operation:
performing a descriptor format translation of a second descriptor from the second format associated with the packet processing circuitry to the first format associated with the emulated device and
providing, to the emulated device, the translated second descriptor.

20. The method of claim 19, wherein the first operation comprises a packet transmit operation or a data write operation and the second operation comprises a packet receive operation or a data read operation.

* * * * *